(12) United States Patent
Gensemer et al.

(10) Patent No.: US 10,302,491 B2
(45) Date of Patent: May 28, 2019

(54) IMAGING METHOD AND APPARATUS

(71) Applicant: COMMONWEALTH SCIENTIFIC AND INDUSTRIAL RESEARCH ORGANISATION, Campbell, Australian Capital Territory (AU)

(72) Inventors: Stephen Gensemer, Campbell (AU); Reza Arablouei, Campbell (AU); Mingrui Yang, Campbell (AU); Wen Hu, Campbell (AU); Frank De Hoog, Campbell (AU)

(73) Assignee: Commonwealth Scientific and Industrial Research Organisation, Campbell, ACT (AU)

( * ) Notice: Subject to any disclaimer, the term of this patent is extended or adjusted under 35 U.S.C. 154(b) by 0 days.

(21) Appl. No.: 15/507,502

(22) PCT Filed: Aug. 28, 2015

(86) PCT No.: PCT/AU2015/050508
§ 371 (c)(1),
(2) Date: Feb. 28, 2017

(87) PCT Pub. No.: WO2016/029276
PCT Pub. Date: Mar. 3, 2016

(65) Prior Publication Data
US 2017/0284867 A1 Oct. 5, 2017

(30) Foreign Application Priority Data
Aug. 29, 2014 (AU) .................................. 2014903436

(51) Int. Cl.
*G01J 3/18* (2006.01)
*G01J 3/02* (2006.01)
(Continued)

(52) U.S. Cl.
CPC ............... *G01J 3/18* (2013.01); *G01J 3/0221* (2013.01); *G01J 3/0229* (2013.01); *G01J 3/14* (2013.01);
(Continued)

(58) Field of Classification Search
CPC .......... G01J 3/0229; G01J 3/0264; G01J 3/18; G01J 3/2823; G01J 3/4338; G01J 3/50
See application file for complete search history.

(56) References Cited

U.S. PATENT DOCUMENTS 7,336,353 B2 2/2008 Brady et al.
2012/0038786 A1 2/2012 Kelly et al.
(Continued)

OTHER PUBLICATIONS

International Search Report for International Application No. PCT/AU2015/050508 dated Oct. 22, 2015 (4 pages).
(Continued)

*Primary Examiner* — Mark R Gaworecki
(74) *Attorney, Agent, or Firm* — Merchant & Gould P.C.

(57) ABSTRACT

Apparatus for hyperspectral imaging, the apparatus including input optics that receive radiation reflected or radiated from a scene, a spatial modulator that spatially samples radiation received from the input optics to generate spatially sampled radiation, a spectral modulator that spectrally samples the spatially sampled radiation received from the spatial modulator to generate spectrally sampled radiation, a sensor that senses spectrally sampled radiation received from the spectral modulator and generates a corresponding output signal and at least one electronic processing device that controls the spatial and spectral modulators to cause spatial and spectral sampling to be performed, receives output signals and processes the output signals in accordance with performed spatial and spectral sampling to generate a hyperspectral image.

18 Claims, 16 Drawing Sheets

(51) Int. Cl.
*G01J 3/433* (2006.01)
*G01J 3/28* (2006.01)
*G06T 9/00* (2006.01)
*G01J 3/14* (2006.01)
*G01J 3/50* (2006.01)

(52) U.S. Cl.
CPC ........... *G01J 3/2823* (2013.01); *G01J 3/4338* (2013.01); *G06T 9/00* (2013.01); *G01J 3/0264* (2013.01); *G01J 3/50* (2013.01); *G01J 2003/2826* (2013.01)

(56) References Cited

U.S. PATENT DOCUMENTS

2012/0200854 A1  8/2012  Bland-Hawthorn
2013/0128042 A1  5/2013  Bridge et al.

OTHER PUBLICATIONS

International Preliminary Report on Patentability for International Application No. PCT/AU2015/050508 dated Feb. 28, 2017 (6 pages).
August et al. "Compressive hyperspectral imaging by random separable projections in both the spatial and the spectral domains." Applied Optics, vol. 52, No. 10, Apr. 1, 2013, pp. D46-D54.
Lin et al. "Dual-coded compressive hyperspectral imaging" Optics Letters, vol. 39, No. 7, Apr. 1, 2014, pp. 2044-2047.
Charles et al. "Learning Sparse Codes for Hyperspectral Imagery." IEEE J. of Selected Topics in Signal Processing, vol. 5, No. 5, Sep. 2011 pp. 963-978.
Bauschke et al. "A Dykstra-like algorithm for two monotone operators." Dec. 28, 2007, pp. 1-10.
Boyle et al. "A Method for finding projections onto the intersection of convex sets in Hilbert Spaces." University of Iowa. Springer-Verlag Berlin Heidelberg 1986, pp. 28-47.
Li et al. "A Compressive Sensing and Unmixing Scheme for Hyperspectral Data Processing." IEEE Transaction on Image Processing, vol. 21, No. 3, Mar. 2012, pp. 1200-1210.
Candes et al. "Near-Optical Signal Recovery from random projections: Universal Encoding Strategies." IEEE Transactions on Information Theory, vol. 52, No. 12, Dec. 2006, pp. 5406-5425.
Candes et al. "Robust Uncertainty Principles: Exact Signal Reconstruction from Highly Incomplete Frequency Information." IEEE Transactions on Information Theory, vol. 52, No. 2, Feb. 2006, pp. 489-509.
Achlioptas. "Database-friendly Random Projections." Proceedings of the twelfth SOGMOD-SIGACTSIGART symposium on Principles of database systems, 2001, pp. 274-281.
Donoho et al. "Compressed Sensing." IEEE Transactions on Information Theory, vol. 52, No. 4, Apr. 2006, pp. 1289-1306.
Duarte et al. "Single-Pixel Imaging via Compressive Sampling: Building simpler, smaller, and less expensive digital cameras." IEEE Signal Processing Magazine, Mar. 2008, pp. 83-91.

Arce et al. "Compressive Coded Aperture Spectral Imaging: Bridging the Gap between remote sensing and signal processing." IEEE Signal Processing Magazine, Jan. 2014, pp. 105-115.
Gehm et al. "Single-shot compressive spectral imaging with a dual-disperser architecture." Optics Express, vol. 15, No. 21, Oct. 17, 2007, pp. 14013-14027.
Golbabaee et al. "Compressive Source Separation: Theory and Methods for Hyperspectral Imaging." IEEE Transactions on Image Processing, vol. 22, No. 12, Dec. 2013, pp. 1-14.
Greer et al. "Accurate Reconstruction of Hyperspectral Images from Compressive Sensing Measurements." Proc. of SPIE, vol. 8717, 2013, pp. 87170E-1-17.
Hahn et al. "Compressive sensing and adaptive direct sampling in hyperspectral imaging." Digital Signal Processing, vol. 26, 2014, pp. 113-126.
Duarte et al. "Kronecker Compressive Sensing." Program in Applied and Computational Mathematics, Princeton University, Dec. 16, 2009. pp. 1-30.
Lin et al. "Spatial-spectral Encoded Compressive Hyperspectral Imaging." ACM Transactions on Graphics, vol. 33, No. 6, Article 233, Nov. 2014, pp. 233:2-233:11.
Lustig et al. "Sparse MRI: The Application of Compressed Sensing for Rapid MR Imaging." Magnetic Resonance in Medicine, vol. 58, 2007, pp. 1182-1195.
Duarte et al. "Kornecker Compressive Sensing." IEEE Transactions on Image Processing, vol. 21, No. 2, Feb. 2012, pp. 494-504.
Michalek et al. "A Piecewise Monotone Subgradient Algorithm for Accurate L1-TV Based Registration of Physical Slices with Discontinuities in Microscopy." IEEE Transactions on Medical Imaging, vol. 32, No. 5, May 2013, pp. 901-918.
Combettes et al. "Proximal Splitting Methods in Signal Processing." Fixed-Point Algorithms for Inverse Problems in Science and Engineering, Sprinter, 2011, chapter 10, pp. 185-212.
Parikh. "Proximal Algorithms." Foundations and Trends in Optimization, vol. 1, No. 3, 2013, pp. 123-251.
Pustelnik et al. "Parallel Proximal Algorithm for Image Restoration Using Hybrid Regularization—Extended Version." IEEE Transactions on Image Processing, vol. 20, No. 9, 2011, pp. 1-32.
Rudin et al. "Nonlinear total variation based noise removal algorithms." Physica D, vol. 60, 1992, pp. 259-268.
Selesnick et al. "Simultaneous Low-Pass Filtering and Total Variation Denoising." IEEE Transactions on Signal Processing, vol. 62, No. 5, Mar. 1, 2014, pp. 1109-1124.
Studer et al. "Compressive fluorescence microscopy for biological and hyperspectral imaging." PNAS, Jun. 11, 2012, pp. E1679-E1687.
Wagadarikar et al. "Single disperser design for coded aperture snapshot spectral imaging." Applied Optics, vol. 47, No. 10, Apr. 1, 2008, pp. B44-B51.
Wehlburg et al. "High Speed 2D Hadamard Transform Spectral Imager." Sand Report, Feb. 2003, pp. 1-118.
Zhang et al. "Randomized SVD Methods in Hyperspectral Imaging." J. of Electrical and Computer Engineering, vol. 2012, Articled ID 409357, 2012 pp. 1-20.
Zhang. "A Nonlocal weighted joint sparse representation classification method for hyperspectral imagery." IEEE J. of Selected Topics in Applied Earth Observations and Remote Sensing, vol. 7, No. 6. Jun. 2014, pp. 2057-2066.

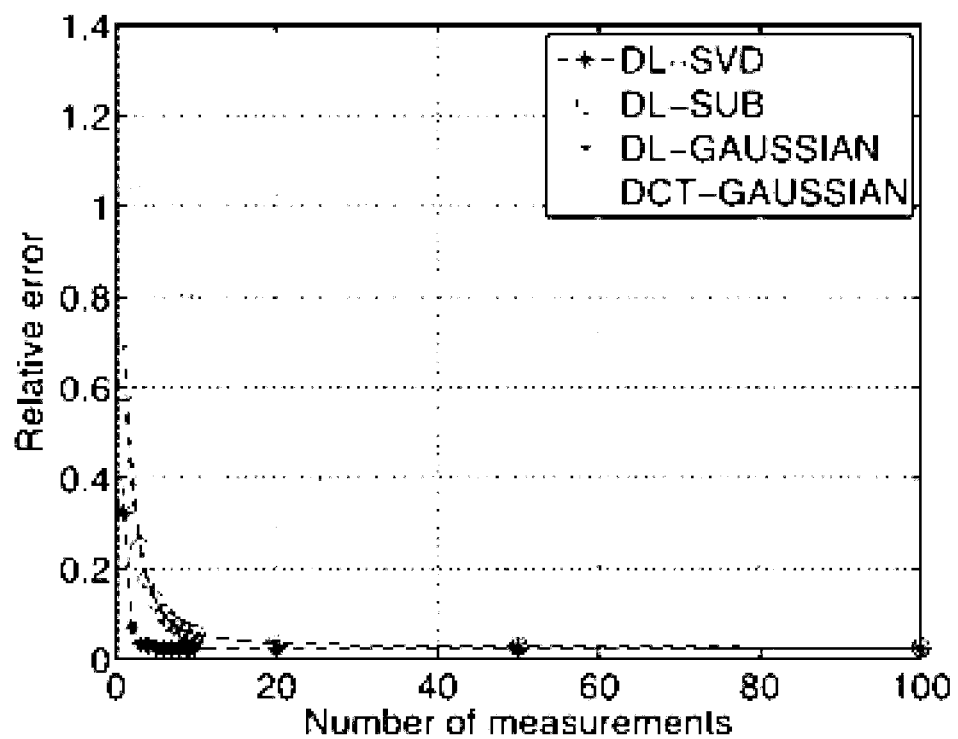
Fig. 6
    
Fig. 10A            Fig. 10B

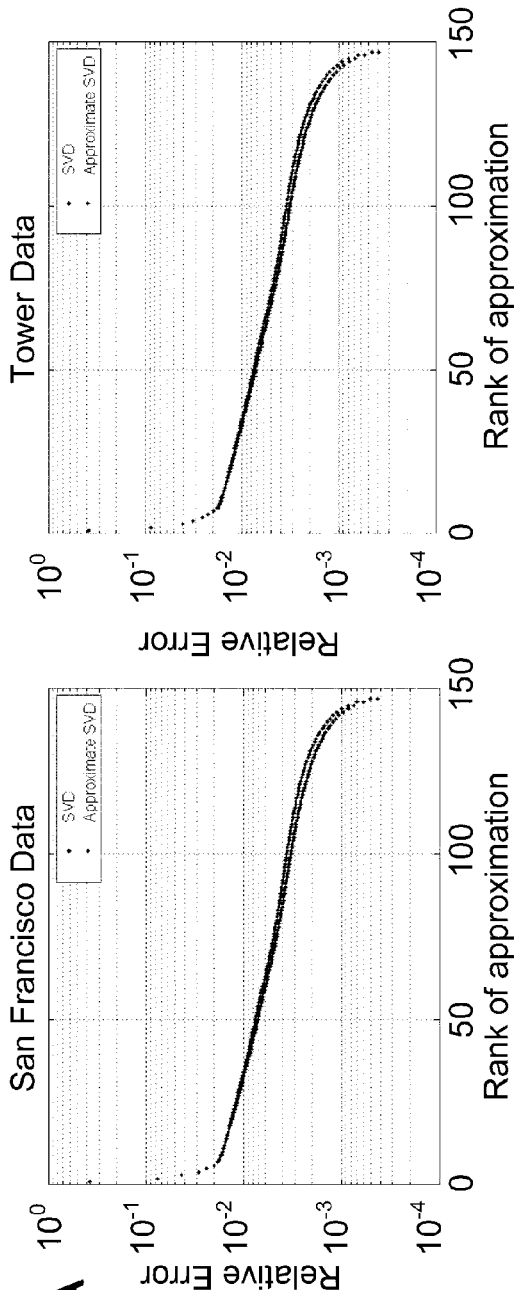
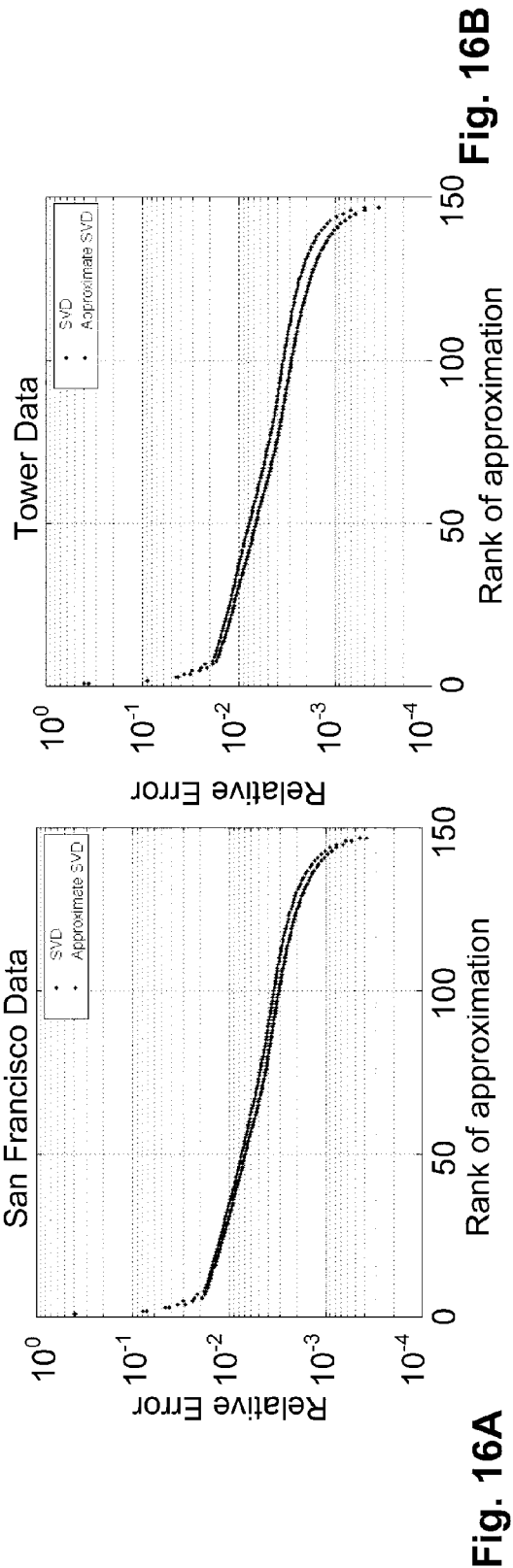
Fig. 15A Fig. 15B
Fig. 16A Fig. 16B

IMAGING METHOD AND APPARATUS

This application is a National Stage Application of PCT/AU2015/050508, filed 28 Aug. 2015, which claims benefit of Serial No. 2014903436, filed 29 Aug. 2014 in Australia and which applications are incorporated herein by reference. To the extent appropriate, a claim of priority is made to each of the above disclosed applications.

BACKGROUND OF THE INVENTION

This invention relates to a method and apparatus for hyperspectral imaging.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Hyperspectral imaging operates by imaging a scene at many frequencies in the electromagnetic spectrum so as to obtain a spectrum for each pixel in the scene. In hyperspectral imaging, the recorded spectra have fine wavelength resolution and cover a wide range of wavelengths, typically extending into the ultra-violet and infra-red portions of the electromagnetic spectrum. This is often performed for the purpose of identifying objects, materials or processes within scenes, for example by using unique spectral 'fingerprints'.

Hyperspectral sensors typically collect information as a set of 'images', each of which represents a respective spectral band, with these being combined to form a three-dimensional hyperspectral cube. Imaging is typically performed using a variety of techniques, such as spatial scanning, spectral scanning, snapshot imaging, and spatio-spectral scanning. However, spatial 2-D hyperspectral cameras cost hundreds of thousands of dollars, while spatial scanning using 1-D or single pixel sensor typically takes many hours and is therefore of only limited use, as its use is often unfeasible, particularly when the scene being imaged is dynamic, or subject to changes in ambient light can impact on the imaging process.

Signal processing is often used to reconstruct a signal from a series of sampling measurements. Nyquist-Shannon sampling theorem demonstrates that a signal can be perfectly reconstructed from sampling if the signal's highest frequency is less than half of the sampling rate. Compressive sampling takes advantage of a signal's sparseness or compressibility in some domain to allow the entire signal to be recreated from an even smaller number of measurements. Thus, compressive sampling utilises sparsity of the signal to allow accurate image reconstruction at a sub-Nyquist sampling rate. In this regard, a signal is deemed to be sparse if it has only a limited number of nonzero elements in some domain and is further said to be compressible if the signal (or its representation in transformed domain) obeys an exponential decay after sorting in magnitude.

US2013/0128042 describes a compressive imaging system and method for quickly detecting spectrally and spatially localized events (such as explosions or gun discharges) occurring within the field of view. An incident light stream is modulated with a temporal sequence of spatial patterns. The wavelength components in the modulated light stream are spatially separated, e.g., using a diffractive element. An array of photodetectors is used to convert subsets of the wavelength components into respective signals. An image representing the field of view may be reconstructed based on samples from some or all the signals. A selected subset of the signals are monitored to detect event occurrences, e.g., by detecting sudden changes in intensity. When the event is detected, sample data from the selected subset of signals may be analyzed to determine the event location within the field of view. The event location may be highlighted in an image being generated by the imaging system.

US2012/0038786 describes mechanisms for increasing the rate of acquisition of compressed/encoded image representations. An imaging system may deliver subsets of a modulated light stream onto respective light sensing devices. The light sensing devices may be sampled in parallel. Samples from each light sensing device may be used to construct a respective sub-image of a final image. The parallelism allows compressed images to be acquired at a higher rate. The number of light sensing devices and/or the number of pixels per image may be selected to achieve a target image acquisition rate. In another embodiment, spatial portions of the incident light stream are separated and delivered to separate light modulators. In yet another embodiment, the incident light stream is split into a plurality of beams, each of which retains the image present in the incident light stream and is delivered to a separate light modulator.

However, these systems require multiple sensors and are therefore expensive, whilst ensuring consistent calibration between multiple sensors can be difficult.

SUMMARY OF THE PRESENT INVENTION

In one broad form the present invention seeks to provide apparatus for hyperspectral imaging, the apparatus including:
  a) input optics that receive radiation from a scene;
  b) a spatial modulator that spatially samples radiation received from the input optics to generate spatially sampled radiation;
  c) a spectral modulator that spectrally samples the spatially sampled radiation received from the spatial modulator to generate spectrally sampled radiation;
  d) a sensor that senses spectrally sampled radiation received from the spectral modulator and generates a corresponding output signal; and,
  e) at least one electronic processing device that:
    i) controls the spatial and spectral modulators to cause spatial and spectral sampling to be performed;
    ii) receives output signals; and,
    iii) processes the output signals in accordance with performed spatial and spectral sampling to generate a hyperspectral image.

Typically apparatus includes a waveguide that receives the spatially sampled radiation from the spatial modulator and transfers this to the spectral modulator.

Typically the waveguide includes at least one of:
  a) a fibre optic array; and,
  b) a photonic lantern including at least one multimode optical fibre that receives the spatially sampled radiation and a plurality of single mode optical fibres that supply the spatially sampled radiation to the spectral modulator.

Typically the spatial modulator includes at least one of:
  a) a digital mirror device;
  b) a microshutter array;
  c) a multiplexed sensor array; and,
  d) a liquid crystal on silicon device.

Typically the frequency modulator includes at least one of:
a) a linear digital mirror device;
b) a liquid crystal on silicon device;
c) a microshutter array;
d) a multiplexed sensor array;
e) a dispersive element that spatially separates the frequency bands;
f) a diffraction grating; and,
g) a prism.

Typically the spatial sampling includes at least one of:
a) a linear sum of multiple random pixels;
b) a single random pixel; and,
c) a weighted sum of selected pixels.

Typically the spectral sampling includes at least one of:
a) a linear sum of multiple random frequency bands;
b) a single random frequency band; and,
c) a weighted sum of selected frequency bands.

Typically the sampling includes at least one of:
a) subsampling;
b) compressive sensing sampling; and,
c) singular value decomposition sampling.

Typically the electronic processing device performs subsampling by:
a) obtaining multiple signals each of which is determined using a sample of a different single randomly selected frequency band or pixel; and,
b) processing the signals in accordance with the different randomly selected frequency bands or pixels and a dictionary.

Typically the electronic processing device randomly selects each frequency band or pixel by randomly selecting a row in an identity matrix.

Typically the electronic processing device performs a singular value decomposition sampling by:
a) obtaining multiple signals each of which is determined using a sample of a different weighted sum of multiple determined frequency bands or pixels; and,
b) processing the signals in accordance with the different weighted sums of multiple determined frequency bands or pixels and a dictionary.

Typically the electronic processing device selects the multiple determined frequency bands or pixels using a singular value decomposition of a matrix dictionary.

Typically the electronic processing device performs compressive sensing by:
a) obtaining a signal determined using a single sample of all pixels and all frequency bands;
b) obtaining multiple signals each of which is determined using a sample of a different linear sum of multiple random frequency bands or pixels; and,
c) processing the signals in accordance with the single sample of all pixels and all frequency bands, the different linear sums of multiple random frequency bands or pixels and a dictionary.

Typically the electronic processing device:
a) obtains a first signal corresponding to a single sample of all pixels and all frequency bands;
b) obtains multiple second signals, each second signal corresponding to a single sample of a respective linear sum of multiple random frequency bands or pixels;
c) generates multiple third signals by subtracting each second signal from the first signal; and,
d) processes the signals by processing the second and third signals.

Typically the electronic processing device processes the output signals by performing hybrid regularization to recover the hyperspectral image.

Typically the electronic processing device:
a) determines a cost function including:
i) a least-square-error data-fitting term;
ii) a spatial regularization term; and,
iii) a spectral regularization term; and,
b) minimises the cost function.

Typically the spatial regularization term is determined at least in part based on a total variation of image frames for all spectral bands.

Typically the spectral regularization term is determined at least in part based on a sparsifying transform of spectral data of hyperspectral image pixels.

Typically the electronic processing device minimises the cost function using an accelerated proximal-subgradient method.

Typically the electronic processing device:
a) determines a dictionary; and,
b) using the dictionary, at least one of:
i) selects sampling to be performed;
ii) selects pixels for spatial sampling;
iii) selects frequency bands for spectral sampling; and
iv) processes the signals to generate a hyperspectral image.

Typically the electronic processing device determines the dictionary using at least one of:
a) sparse coding to learn the dictionary;
b) singular value decomposition of sample data to calculate the dictionary; and, c) scene attributes to select one of a number of learned dictionaries.

Typically the sample data is test data captured during sensor calibration.

Typically the electronic processing device determines scene attributes using at least one of:
a) signals received from a scene sensor; and,
b) user input commands.

Typically the sensor is a single pixel hyperspectral sensor.

In another broad form the present invention seeks to provide a method for hyperspectral imaging, the method including:
a) receiving radiation from a scene;
b) spatially sampling the radiation to generate spatially sampled radiation;
c) spectrally sampling the spatially sampled radiation to generate spectrally sampled radiation;
d) sensing the spectrally sampled radiation; and,
e) processing the spectrally sampled radiation in accordance with the performed spatial and spectral sampling to generate a hyperspectral image.

BRIEF DESCRIPTION OF THE DRAWINGS

An example of the present invention will now be described with reference to the accompanying drawings, in which:

FIG. 6 is a graph showing an example of the comparison of the error rate associated with different sampling and decoding methods;

FIGS. 15A and 15B are graphs illustrating examples of relative error of truncated SVD and approximate SVD based on 0.1% of spatial projections for San Francisco and Stanford Tower hyperspectral images respectively;

FIGS. 16A and 16B are graphs illustrating examples of relative error of approximate SVD based on learned singular vectors from different hyperspectral data for San Francisco and Stanford Tower hyperspectral images respectively;

DETAILED DESCRIPTION OF THE PREFERRED EMBODIMENTS

Figure 1:
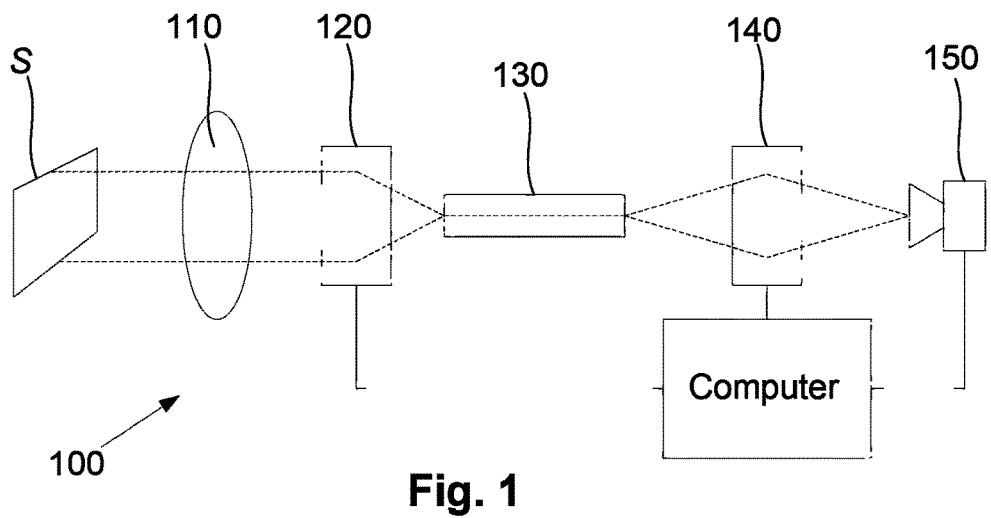
FIG. 1 is a schematic diagram of an example of a hyperspectral imaging apparatus.
Figure 2:
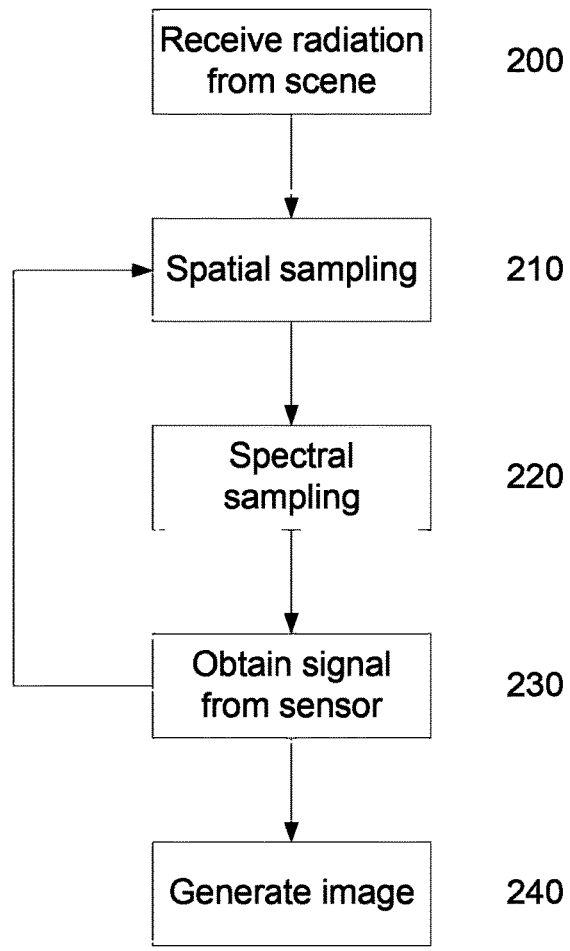
FIG. 2 is a flow chart of an example of a hyperspectral imaging method.

An example of an apparatus and associated method for hyperspectral imaging will now be described with reference to FIGS. 1 and 2.

In this example, the apparatus 100 includes input optics 110, a spatial modulator 120, an optional waveguide 130, a spectral modulator 140, a sensor 150 and one or more electronic processing devices 160.

In use, the input optics 110 receive radiation from the scene and provides this to the spatial modulator 120. The input optics 110 can be any suitable form of optical arrangement capable of capturing electromagnetic radiation emitted or reflected from a scene, and this can include one or more imaging lenses, an aperture, or the like.

The spatial modulator 120 receives the radiation from the input optics 110 and spatially samples the radiation to generate spatially sampled radiation. This can be achieved using any suitable mechanism capable of transferring radiation from selected spatial regions of the received radiation, such as respective pixels of an image of the scene, to the optical waveguide 130. This can include techniques such as filtering the radiation using a suitable filtering device, or selectively reflecting radiation using a digital mirror device (DMD), Liquid Crystal on Silicon (LCOS) device, or the like. Alternatively, one or more sensors could be selectively exposed using a microshutter array or a multiplexed sensor array. It will be appreciated from this that a range of different spatial modulation techniques could be used.

The optional waveguide 130 receives the spatially sampled radiation from the spatial modulator 120 and transfers this to the spectral modulator 140. The use of the waveguide, whilst not essential, helps maximise the transfer of radiation to the spectral modulator, thereby reducing transmission losses and maximising the radiation ultimately incident on the sensor, as will be described in more detail below. The waveguide can be of any appropriate form, such as an optical fibre array, photonic lantern, or the like.

The spectral modulator 140 spectrally samples the spatially sampled radiation received from the waveguide to generate spectrally sampled radiation. This can be achieved using any suitable mechanism, but typically involves using a dispersion element, such as a prism, diffraction grating or the like, to spatially separate different spectral bands of radiation, with these then being selectively transferred to the sensor, for example using a DMD, LCOS device, or the like. It will also be appreciated that a microshutter array and/or a multiplexed sensor array could alternatively be used.

The sensor 150 senses the spectrally sampled radiation received from the spectral modulator 140 and generates a corresponding output signal. The sensor could be of any suitable form and is typically a single pixel hyperspectral sensor, single point spectrometer, or the like.

The one or more electronic processing devices 160 are coupled to the spatial and spectral modulators 120, 140 to cause particular sequences of spatial and/or spectral sampling procedures to be performed, as well as to the sensor 150, allowing output signals to be received and processed to generate the hyperspectral image.

The one or more electronic process devices could be of any suitable form and are typically part of one or more processing systems, which may be interconnected via a network architecture, for example a part of a cloud based or other distributed architecture.

An example of operation of the sampling process will now be described with reference to FIG. 2.

In this example, at step 200 radiation is received from a scene, with this being spatially sampled using the spatial modulator 120 at step 210. The generated spatially sampled radiation is transferred to the spectral modulator 140 via the waveguide, where it is spectrally sampled at step 220, with the spectrally sampled radiation being transferred to the sensor 150, allowing the electronic processing device to obtain signals from the sensor 150 at step 230. This process is repeated allowing different spatial and spectral sampling to be performed so that samples can be obtained from different pixels and in different spectral bands, with these being decoded at step 240 to generate the image.

Accordingly the above described method and apparatus allows hyperspectral imaging of a scene to be performed using a combination of spatial and spectral sampling so that that a hyperspectral image can be produced. By suitable selection of spatial and sampling processes, this allow imaging to be performed using a reduced number samples, allowing imaging to be performed rapidly, whilst avoiding the expenses of requiring spatial scanning or multiple dimensional sensors.

In one example, the spatial sampling includes a linear sum of multiple random pixels, a single random pixel or a weighted sum of selected pixels. Similarly, spectral sampling typically includes a linear sum of multiple random frequency bands, a single random frequency band or a weighted sum of selected frequency bands. Thus, the sampling could include compressive sampling, subsampling, or sampling based on singular value decomposition techniques (SVD sampling), together with associated with decoding regimes. These different sampling techniques can be used in different circumstances, depending on the preferred implementation.

In one specific example, the electronic processing device performs subsampling by obtaining multiple signals each of which is determined using a sample of a different single randomly selected frequency band and/or pixel and processing the signals in accordance with the different randomly selected frequency bands and/or pixels and a dictionary. In this regard the dictionary will typically be in the form of a 2-D matrix with floating point numbers, and the values of the floating point numbers derived from training sets, as would be understood by persons skilled in the art. When performing this process, the electronic processing device can randomly select each frequency band and/or pixel by randomly selecting a row in an identity matrix, and then using the selected row when performing decoding of the signals using the dictionary, as will be described in more detail below.

In the case of singular value decomposition sampling, this is typically performed by obtaining multiple signals each of which is determined using a sample of a different weighted sum of multiple determined frequency bands and/or pixels and processing the signals in accordance with the different weighted sums of multiple determined frequency bands and/or pixels and a dictionary. This is typically achieved by selecting the multiple determined frequency bands or pixels using a singular value decomposition of a matrix dictionary, and then using this again when decoding the signals to form an image.

When performing compressive sensing, this typically involves obtaining a single signal determined using a sample of all pixels and all frequency bands, obtaining multiple signals each of which is determined using a sample of a different linear sum of multiple random frequency bands and/or pixels and processing the signals in accordance with the single sample of all pixels and all frequency bands, the samples of the different linear sums of multiple random frequency bands and/or pixels and a dictionary.

To achieve this, the process typically involves obtaining a first signal corresponding to a single sample of all pixels and all frequency bands, obtaining multiple second signals, each second signal corresponding to a single sample of a respective linear sum of multiple random frequency bands or pixels, generating multiple third signals by subtracting each second signal from the first signal and processing the signals by processing the second and third signals. The purpose behind this is to allow symmetrical compressive sensing to be performed, as opposed to asymmetrical processing as is more typically performed. This effectively halves the amount of samples that need to be obtained in order to achieve the same accuracy of decoding, as will be described in more detail below.

As an alternative, hybrid regularization can be performed by minimizing a cost function including a least-square-error data-fitting term, a spatial regularization term and a spectral regularization term, as will be described in more detail below.

In order to optimise the sampling and/or decoding of the signals, the electronic processing device typically determines a dictionary and uses the dictionary to either select sampling to be performed, select pixels for spatial sampling, select frequency bands for spectral sampling or to process the signals to generate a hyperspectral image.

The dictionary can be determined in any suitable manner and this can include using sparse coding to learn the dictionary, using scene attributes to select one of a number of learned dictionaries, for example which are stored in a database or the like, or using any other suitable technique. In the event that scene attributes are used, these could be determined using signals received from a scene sensor, such as a CCD (charge coupled device) image sensor, thermal sensor, or the like, or in accordance with user input commands. For example, the user can specify a type of image or type of scene being imaged, with this being used to select a dictionary. Alternatively, the scene could be imaged using visible or infra-red radiation, with the resulting image being analysed to determine the scene attributes.

In one particular example, a dictionary for a scene can be calculated using a small fraction of the scene data. To achieve this, spectral data for each of a number of spectral wavelengths is sensed for a set number of pixels, such as 1% of an entire image, selected randomly or based on a pattern, such as every $100^{th}$ pixel. A singular value decomposition of the resulting data matrix can be performed and the calculated left (or right) singular vector subspace can be taken as the dictionary. In this scenario, the singular vector subspace can be used to represent the spectral data of the image pixels in a sparse fashion. This can be used to identify particular multiplexing schemes that should be employed in order to optimise the process of reconstructing the hyperspectral image of the scene with minimal spectral sampling.

In one particular example, this process is performed based on test data during sensor calibration to learn the dictionary. Thus, whilst the sensor is being calibrated, the test data is collected and used to calculate a dictionary, which can then be used in subsequent hyperspectral imaging.

Figure 3:
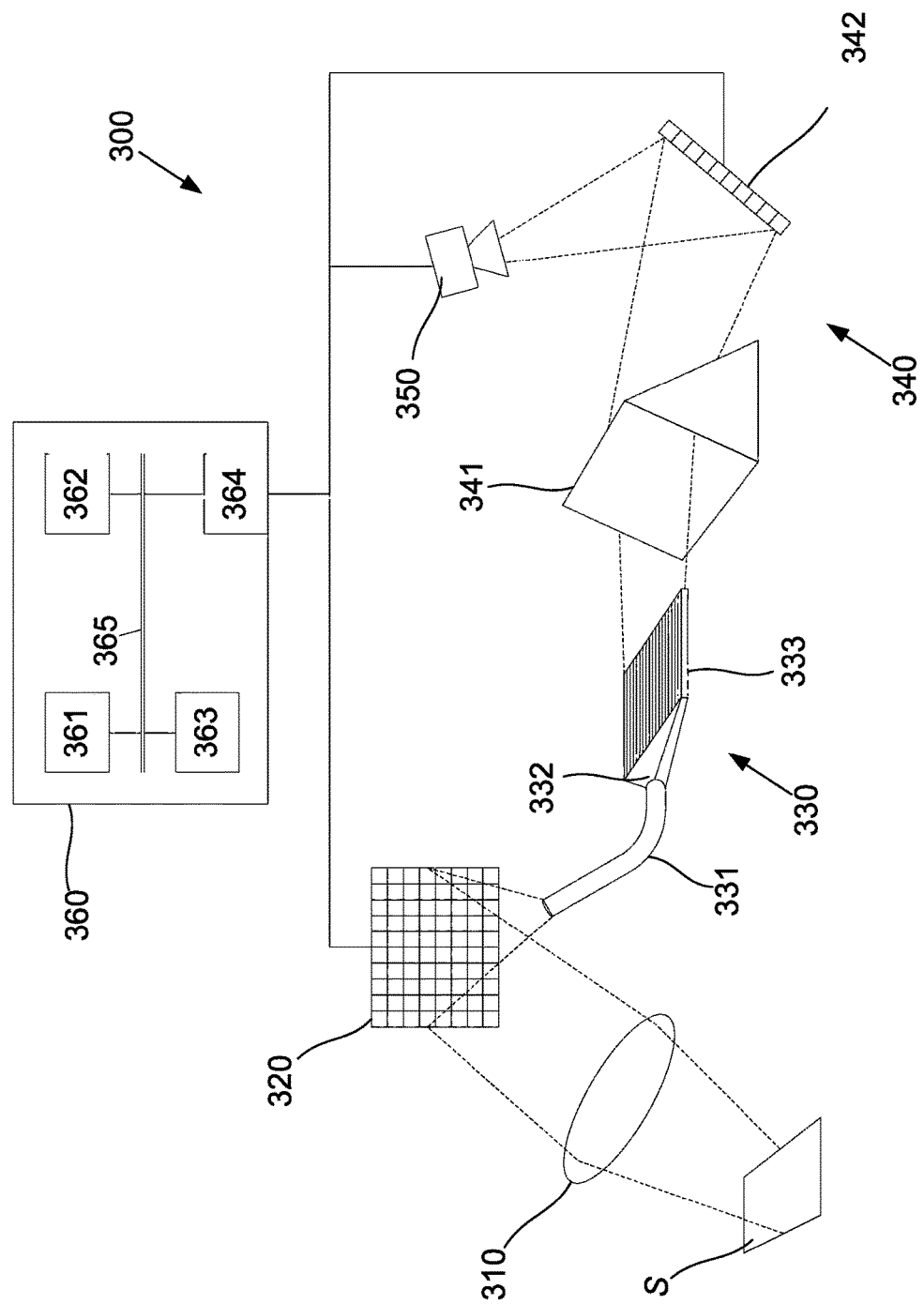
FIG. 3 is a schematic diagram of a second example of a hyperspectral imaging apparatus.

A further example of apparatus for hyperspectral imaging will now be described with reference to FIG. 3.

In this example, the apparatus 300 includes input optics 310, such as a lens system that focuses radiation to form an image of the scene in an imaging plane that is aligned with a DMD 320. The DMD 320 is controlled by a processing system 360, which selectively controls individual mirrors of the DMD 320 allowing radiation corresponding to one or more selected pixels within the scene image to be selectively reflected towards a waveguide 330, thereby allowing the scene image to be spatially sampled.

In this example, the waveguide 330 includes one or more multi-mode optical fibres 331, which receive the spatially modulated radiation from a number of different incident angles depending on the spatial location of the pixel within the scene image. The radiation is transmitted along the multi-mode fibre optical fibre(s) 331 and is transferred via a photonic lantern 332 to plurality of single mode fibres 333. The single mode fibres 333 are provided in a planar spaced apart configuration, allowing the spatially modulated radiation to be supplied to a spectral modulator 340 as a plurality of substantially parallel beams. The operation and structure of photonic lanterns is known in the art and described for example in US2012/0200854 and will not therefore be described in any further detail. However, it will be appreciated that the use of the photonic lantern increases the effectiveness of radiation transfer to the spectral modulator 340, in particular allowing radiation captured at multiple incident angles form the spatial modulator to be provided to the spectral modulator as substantially parallel beams thereby maximising the intensity of radiation ultimately incident on the sensor, which in turn helps minimise acquisition time, as will be appreciated by persons skilled in the art.

The spectral modulator 340 includes a dispersive element in the form of a prism 341. The single mode optical fibres 333 are arranged in a plane, which is parallel to an axis of the prism, so that different frequencies from the received spatially sampled radiation are dispersed in a direction perpendicular to the plane. The dispersed radiation impinges on a linear DMD 342, which is controlled by the processing system 360, allowing one or more selected frequency bands to be reflected towards a sensor 350, such as an Ocean Optics USB-650 single point spectrometer.

In use, the processing system 360 operates to control the DMDs 320, 342 and receive signals from the sensor, allowing these to be processed, either locally or through transmission to a remote processing system, such as a server or cloud based system.

In one example, the processing system 360 typically includes an electronic processing device, such as at least one microprocessor 361, a memory 362, an optional input/output device 363, such as a keyboard and/or display, and an external interface 364, interconnected via a bus 365. In this example the external interface 364 can be utilised for connecting the processing system 360 to the DMDs 320, 342, and the sensor 350, as well as other peripheral devices, such as communications networks, databases, other storage devices, or the like. Although a single external interface 364 is shown, this is for the purpose of example only, and in practice multiple interfaces using various methods (eg. Ethernet, serial, USB, wireless or the like) may be provided.

In use, the microprocessor 361 executes instructions in the form of applications software stored in the memory 362 to perform required processes, such as communicating with other processing or computer systems, controlling the DMDs 320, 342, or receiving signals from the sensor 350. Thus, actions performed by a processing system 360 are performed by the processor 361 in accordance with instructions stored as applications software in the memory 362 and/or input commands received via the I/O device 363, or commands received from other processing or computer systems. The applications software may include one or more software modules, and may be executed in a suitable execution environment, such as an operating system environment, or the like.

Accordingly, it will be appreciated that the processing systems 360 may be formed from any suitable processing system, such as a suitably programmed PC, Internet terminal, lap-top, hand-held PC, smart phone, PDA, tablet, or the like. Thus, in one example, the processing system 300 is a standard processing system such as a 32-bit or 64-bit Intel Architecture based processing system, which executes software applications stored on non-volatile (e.g., hard disk) storage, although this is not essential. However, it will also be understood that the processing systems 360 can be any electronic processing device such as a microprocessor, microchip processor, logic gate configuration, firmware optionally associated with implementing logic such as an FPGA (Field Programmable Gate Array), or any other electronic device, system or arrangement.

Operation of the imaging apparatus will now be described in more detail with reference to FIGS. 4 and 5.

Figure 4:
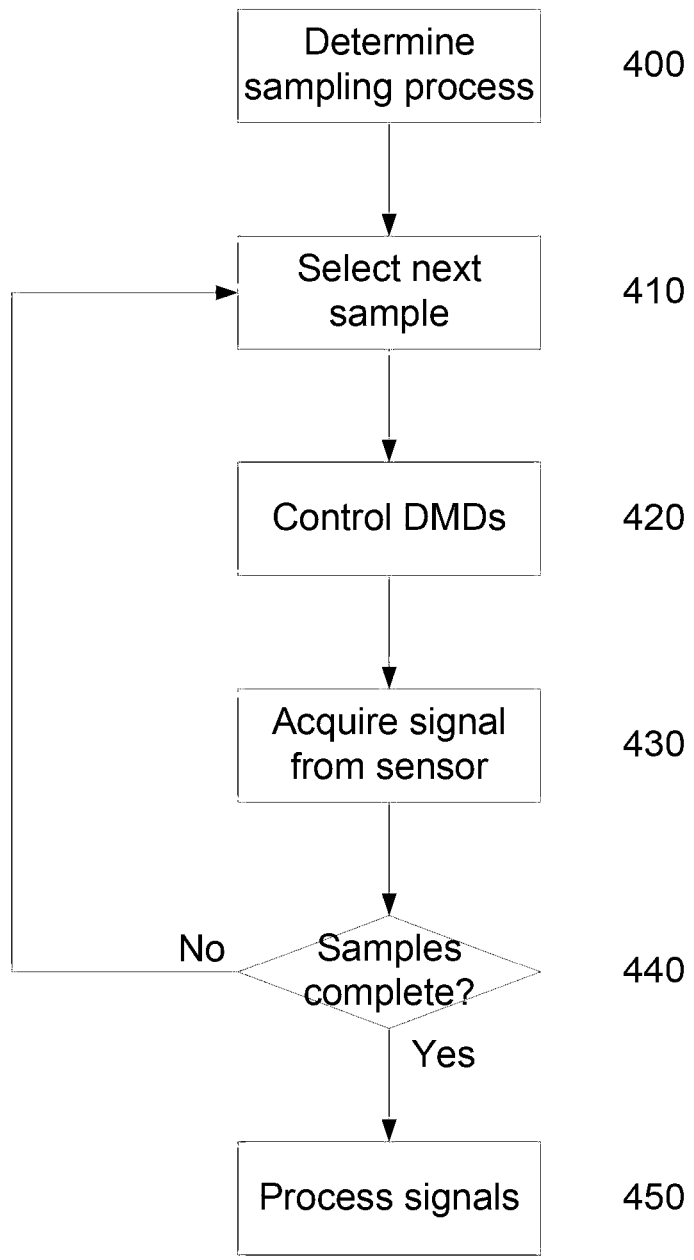
FIG. 4 is a flow chart of a second example of a hyperspectral imaging method.
Figure 5:
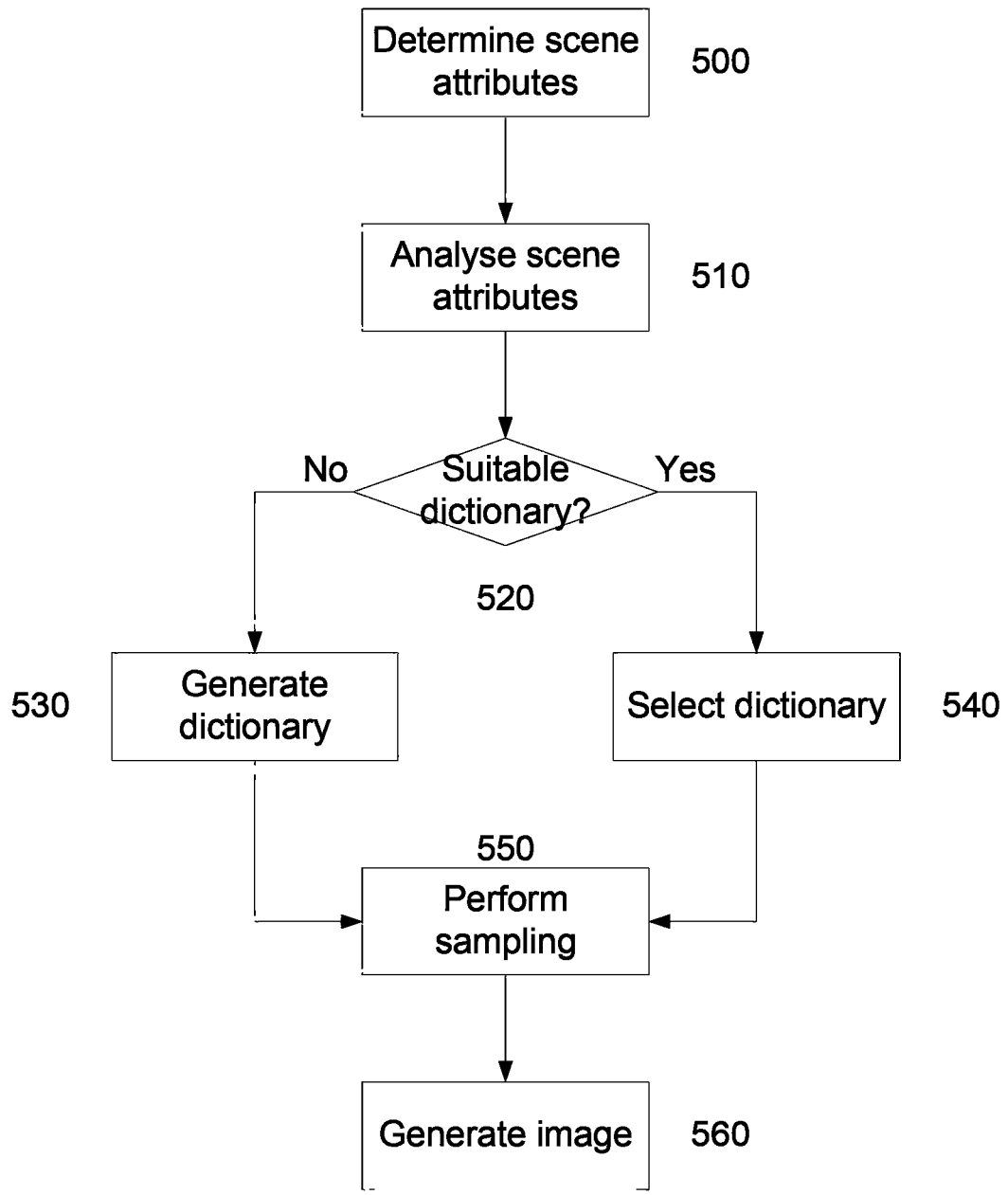
FIG. 5 is a flow chart of an example of a dictionary determination process.

In the process shown in FIG. 4, at step 400, the processing system 360 determines a sampling process to be performed. This could be performed automatically and/or in accordance with user input commands.

In one example, the sampling process could form part of an imaging protocol selected, for example, based on the nature of the image or scene to be processed, with the imaging protocol specify the type of sampling and/or associated sample processing to be performed, together with any other required information such as dictionaries or the like.

As previously described, the types of sampling performed typically include at least one of symmetrical compressive sampling, subsampling and SVD sampling, and the nature of the different types of sampling are summarised below in Table 1.

TABLE 1

|  | Symmetrical compressive sampling | Sub-sampling | SVD |
| --- | --- | --- | --- |
| Reference sample | Single sample of all pixels at all frequencies | | |
| Spatial sampling | Multiple randomly selected pixels Linear sum | Single randomly selected pixel | Multiple determined pixels Weighted sum |
| Spectral sampling | Multiple randomly selected frequencies Linear sum | Single randomly selected frequency | Multiple determined frequencies Weighted sum |

Thus, symmetrical compressive sampling uses a single reference sample of all pixels at all frequencies, followed by spatial and spectral sampling of multiple randomly selected pixels at multiple randomly selected frequencies. By contrast subsampling samples a single pixel at a single frequency, whilst SVD samples multiple deterministically selected pixels at deterministically selected frequencies.

At step 410, the processing system 360 determines a next sample to be performed using the determined sampling process.

For example, in the case of subsampling, this is achieved by randomly choosing a row from an Identity matrix, with each row corresponding to a respective pixel and frequency band. During the decoding process, the selected rows from the Identity matrix will be used with a learned dictionary to recover the original signal using standard methods.

In the case, of SVD sampling, a singular value decomposition (SVD) is performed on the dictionary, with the first in left singular vectors (corresponding to singular values in descending order), being used to define in fixed sampling patterns used to obtain the in samples.

At step 420, the processing system 360 controls the DMDs 320, 342, so that the sensor is exposed to radiation that has been spatially and spectrally sampled as required, with the processing system 360 acquiring a signal from the sensor 350 at step 430. At step 440, the processing system 360 determines if all samples have been performed and if not the process returns to step 410. Otherwise, at step 450, the signals are processed allowing the hyperspectral image to be generated.

In this regard, when performing symmetrical compressive sensing, a symmetric Bernoulli process is used, with each of the samples being subtracted from the reference sample, allowing fully symmetrical processing to be performed.

The mathematical model behind this can be described as follows. Assume y is the measurement taken by the symmetric Bernoulli sensing matrix A. Denote x as the corresponding sampled pixel. Then we have y=Ax, which can be decomposed as y=A+x−A−x, where A+ and A− denote the unsigned matrices corresponding to the positive and negative parts respectively. Now define y+ to be A+x and y− to be A−x. y+ is directly measured but y− is not collected. The way around this is to fully open DMD once and record the measurement yf. Then y−=yf−y+. Notice that the measurement obtained from the device contains an offset, but the y− obtained from the arithmetic above does not have it. Therefore, measurement y can be obtained via y=2y+−yf−offset. This method utilizes all the information from the light-field. Moreover, the measurement y is device independent, because this method eliminates the effect of the offset which is device dependent.

In the case, of subsampling, as described above, the rows from the identity matrix used in sampling the radiation are used together with the dictionary to decode the signals and generate the image.

In the case of SVD based sampling, the SVD of the dictionary matrix can be used in decompressing the image.

An example of the SVD analysis will now be described in more detail from a mathematical perspective. In this regard, let $\Phi \in R^{m \times d}$ denote the sampling matrix and $D \in R^{d \times n}$ denote the sparsifying dictionary. Let $y \in R^m$ be the measurement vector obtained from applying the sampling matrix $\Phi$ to the original signal x=Ds. Then the problem of reconstructing the original signal $x \in R^d$ can be formulated as follows:

$$\min_s \frac{1}{2} \|y - As\|_2^2 + \lambda \|s\|_1 \quad (1)$$

where the measurement matrix A=$\Phi$D. And x can be recovered from x=Ds.

The sparsifying dictionary D is trained from a set of training signals $\{x_i\}$ using sparse coding, which can be formulated as $$\min_{s_i, D} \sum_i \frac{1}{2} \|r_i - Ds_i\|_2^2 + \lambda \|s_i\|_1 \quad (2)$$

where $s_i$ and D can be updated recursively.

It is then possible to perform SVD on the sparsifying dictionary D to obtain the sampling matrix $\Phi$. The economical SVD of D can be written as:

$$D = U\Sigma V^T \quad (3)$$

where: $U \in R^{d \times d}$ contains the left singular vectors, $\Sigma \in R^{d \times d}$ is a diagonal matrix containing all the singular values, and $V \in R^{n \times d}$ contains the right singular vectors.

Now let $U_m$ denote the submatrix of U containing only the first in columns of U. By setting the sampling matrix $\Phi = U_m^T$, we obtain a deterministic sampling strategy. Then the sampling process is simply a mixture of the original signal with fixed weights.

The reconstruction problem can be further simplified due to this special sampling strategy. Since:

$$U_m^T D = U_m^T U \Sigma V^T \quad (4)$$
$$= \Sigma_m V_m^T. \quad (5)$$

where $\Sigma_m$ is a diagonal matrix containing the in largest singular values of the dictionary D and $V_m$ contains the m corresponding right singular vectors, we have from (1):

$$\min_s \frac{1}{2} \|y - \Sigma_m V_m^T s\|_2^2 - \lambda \|s\|_1. \quad (6)$$

which is equivalent to the minimization problem $$\min_s \frac{1}{2} \|\tilde{y} - V_m^T s\|_2^2 + \lambda \|s\|_1. \quad (7)$$

where $\tilde{y} = \Sigma_m^{-1} y$

This results in a well-conditioned measurement matrix in the sense that it has normalized rows, allowing this to be processed using standard techniques.

An example of the manner in which the dictionary can be determined will now be described with reference to FIG. 5.

In this example, at step 500, the processing system 360 determines scene attributes. The scene attributes are used to identify the type of scene that is being imaged and could be obtained in a variety of manners. For example, this could be achieved using user input commands, in which a user specifies attributes of the scene that is to be imaged, such as indicating the presence of any particular objects, the colour of the scene, certain information that is to be derived from the scene, or the like. Alternatively, this could be achieved using sensing mechanisms. For example, the processing device 360 could acquire an RGB image of the scene, using a CCD sensor or the like, which can then be analysed using standard image processing techniques, allowing scene attributes to be derived. Alternatively, other forms of sensing could be used, such as temperature sensing, or the like. In either case, this allows gross features of the scene, such as the temperature, RGB distribution or the like, to be used in determining the dictionary that is used.

At step 510, the scene attributes are analysed to determine if a suitable dictionary exists for analysing the scene. In this regard, a database of existing dictionaries can be provided, with scene attributes associated with each of the dictionary defining the types of scene for which the dictionary can be used. At step 520, it is determined if a suitable dictionary exists, for example by comparing determined scene attributes, with scene attributes associated with the stored dictionaries.

If no suitable dictionary exists, a new dictionary is generated at step 530. This can be performed using any suitable technique, such as sparse coding or the like, as will be appreciated by persons skilled in the art. Alternatively, a suitable dictionary from the existing dictionaries is selected at step 540. Once the dictionary has been determined, sampling can be performed and the image generated at step 550 and 560, substantially as described above.

It will be appreciated that the above described technique for selecting a dictionary also applies to the process of more broadly selecting the type of sampling protocol to be used.

In the above described example, it is assumed that the process is performed using a stand-alone computer system. However, this is not essential and the process can be performed at least in part using a distributed arrangement. For example, the processing system 360 could be used to select the dictionary and/or sampling protocol and also perform the imaging process. The generated signals could then be provided to a remote computer system, such as a cloud based arrangement, allowing the analysis to be performed remotely, with the resulting image being returned to the processing system 360 for display. This can be performed to allow processing intensive activities to be performed using a distributed arrangement such as cloud computing or the like. This can also be performed to allow the particular dictionaries used as confidential, thereby allowing particularly beneficial analysis techniques to be retained as confidential. Similarly, the process of selecting the dictionary and/or sampling protocol could also be performed with the analysis.

Results demonstrating the effectiveness of the above described technique will now be described with reference to FIGS. 6 to 10.

In particular, FIG. 6 shows the result of analysing landscape hyperspectral images of San Francisco from SCIEN lab at Stanford University, which is publicly available online. The image cube has a spatial dimension of 1000×702 and contains 148 spectral bands ranging from 415 nm to 950 nm. The goal of this simulation is to compare the performance of four different combinations of sparse domains and sensing methodology using the l1-magic algorithm.

From FIG. 6, it is clear that the combination of traditional discrete cosine transform (DCT) with a Gaussian sensing matrix performs much worse than the combinations of dictionary learning (DL) with compressive Gaussian sampling, subsampling or SVD. The combination of DL with subsampling performs almost the same as that of DL with Gaussian compressive sampling, whilst the combination of DL with SVD performs the best.

In this regard, with SVD, it is only necessary to sample a very small fraction of the total available spectral bands to achieve a very good approximation. Moreover, it is a deterministic procedure, which has no probability of failure in contrast to the random sampling approach.

Figure 7A:
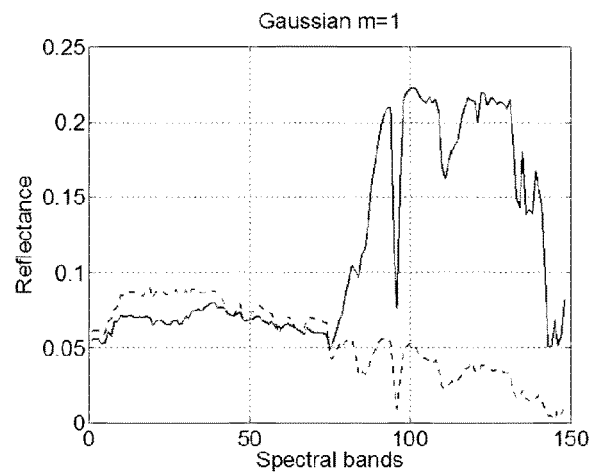
FIGS. 7A to 7C are graphs of examples of the spectrum of a single pixel as decoded using Gaussian compressive sampling using 1, 5 and 10 measurements respectively.
Figure 7B:
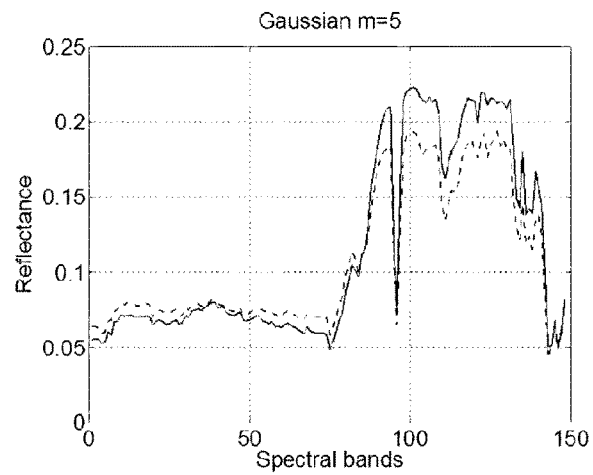
Figure 7C:
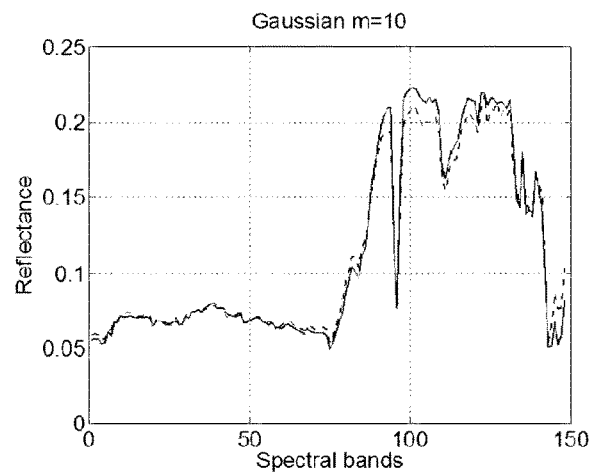
Figure 8A:
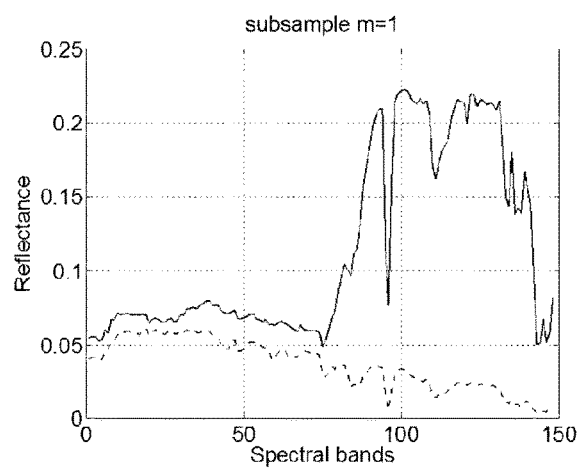
FIGS. 8A to 8C are graphs of examples of the spectrum of a single pixel as decoded using subsampling using 1, 5 and 10 measurements respectively.
Figure 8B:
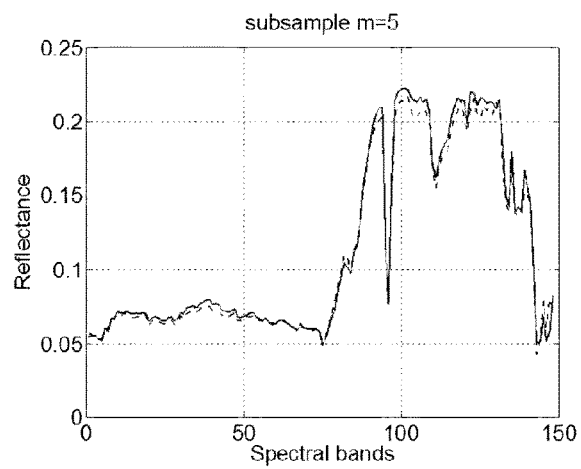
Figure 8C:
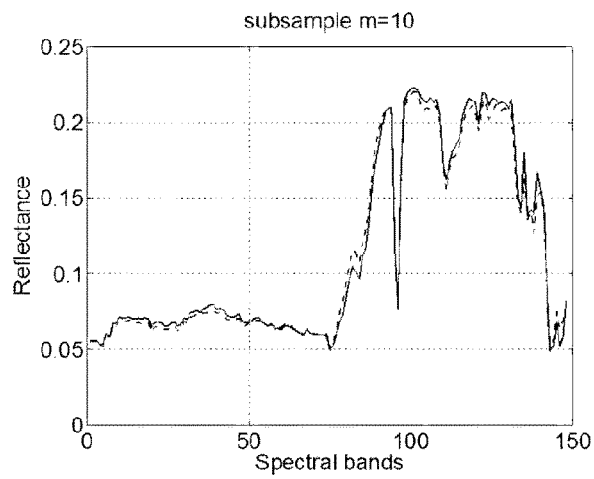
Figure 9A:
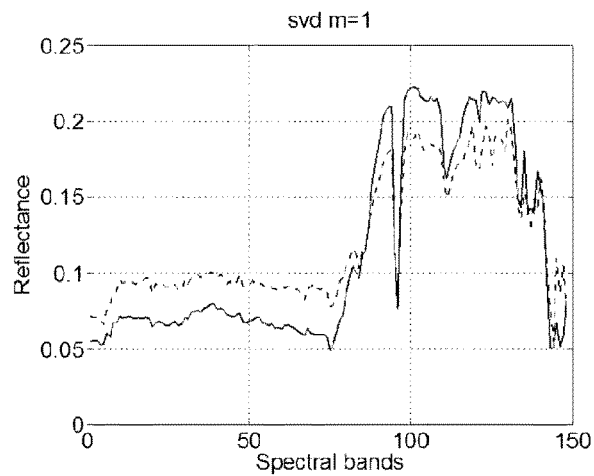
FIGS. 9A to 9C are graphs of examples of the spectrum of a single pixel as decoded using singular value decomposition using 1, 5 and 10 measurements respectively; and, FIGS. 10A and 10B are example images decoded using an asymmetric and symmetric Bernoulli matrix, respectively.
Figure 9B:
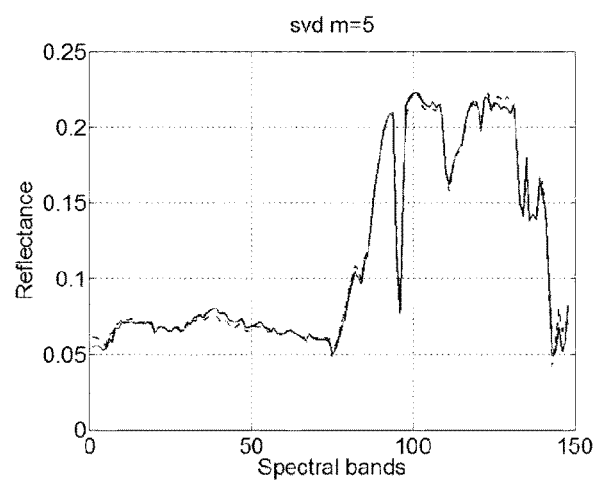
Figure 9C:
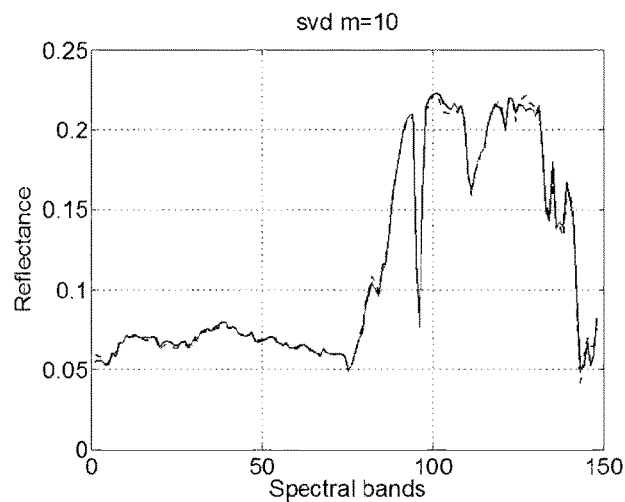

FIGS. 7 to 9 use the same dataset as for FIG. 6, but provide a more straightforward view of the reconstruction performance of the three combinations mentioned above using DL as the sparse domain. All the Figures describe the spectrum of the same randomly picked pixel. The solid line is the ground truth of the spectrum of this pixel, while the dashed curve is the reconstructed spectrum. As shown, Gaussian sampling and subsampling have about the same performance and both fail when the number of measurement is 1 (0.68%) and start to recover the spectrum better with more measurements. The combination of DL with SVD performs the best in the sense that when the number of measurement is 1, the reconstruction has been able to give a rough shape of the true spectrum, and when the number of measurement is 5 (3.38%), it can already recover the true spectrum accurately. It will also be noted that the above observation coincides with the results we have for the relative error figure.

The examples shown in FIGS. 10A and 10B are obtained from a real experimental setup, which takes hyperspectral images of a scene of the letter "F" in white color with black background color. The devices we use here include a DMD with controller board from the DLP Light Commander and an Ocean Optics USB-650 single point spectrometer. They both correspond to the 649 nm spectral band and use the same number of measurements (955 out of 7752, which is 12.32% of the original data).

FIG. 10A is the reconstructed spectral image from the conventional single pixel camera, which uses an asymmetric binary 0-1 pattern to obtain the measurements, whereas FIG. 10B takes advantage of symmetric compressive sampling using a Bernoulli sensing matrix. Using the same number of measurements, the symmetric sampling provides significantly improved results by virtue of the fact that the symmetric nature of the sampling procedure utilises additional information that is effectively omitted using the asymmetric approach.

Figure 11A:
FIG. 11A is an averaged spectral image of a scene.
Figure 11B:
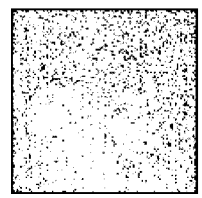
FIGS. 11B to 11P are individual spectral images used to form the average image of FIG. 11A.
Figure 11C:
FIG. 11Q is an RGB image extracted from the spectral images of FIGS. 11B to 11P.
Figure 11D:
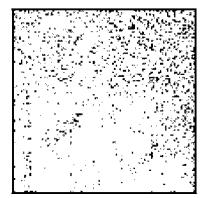
Figure 11E:
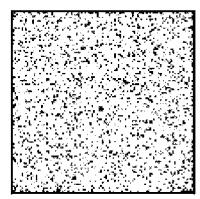
Figure 11F:
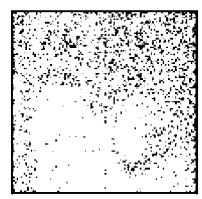
Figure 11G:
Figure 11H:
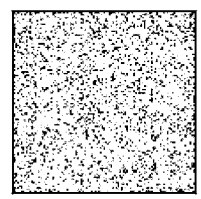
Figure 11I:
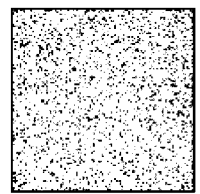
Figure 11J:
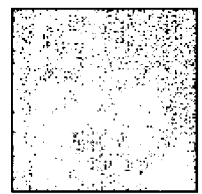
Figure 11K:
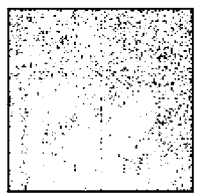
Figure 11L:
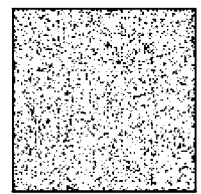
Figure 11Q:
Figure 11M:
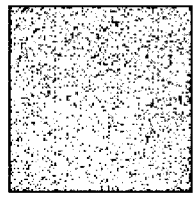
Figure 11N:
Figure 11O:
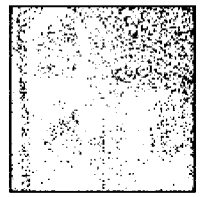
Figure 11P:
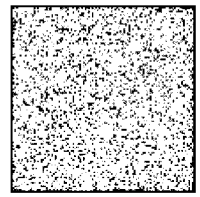
Figure 12B:
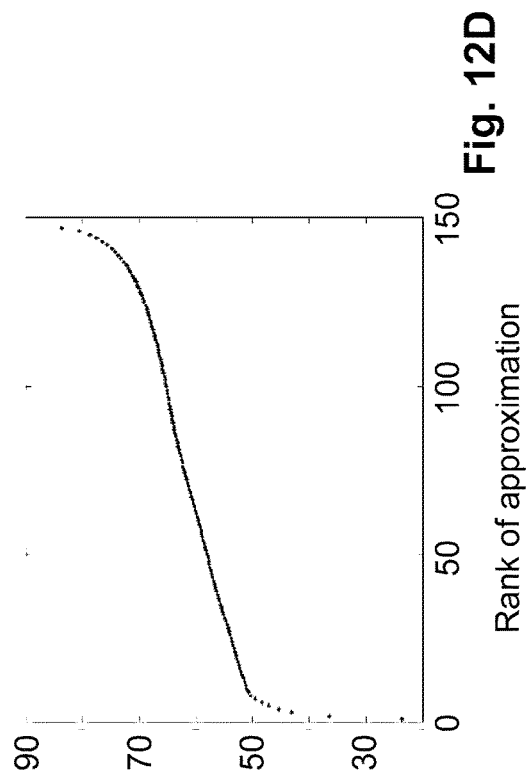
FIGS. 12A to 12D are graphs illustrating examples of relative error and peak signal to noise ratio for truncated singular value decomposition (SVD) of San Francisco and Stanford Tower hyperspectral images respectively.
Figure 12A:
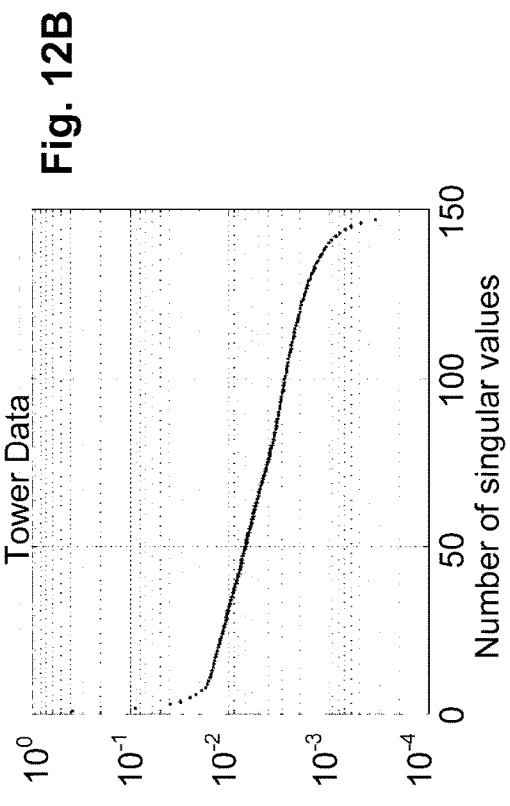
Figure 12D:
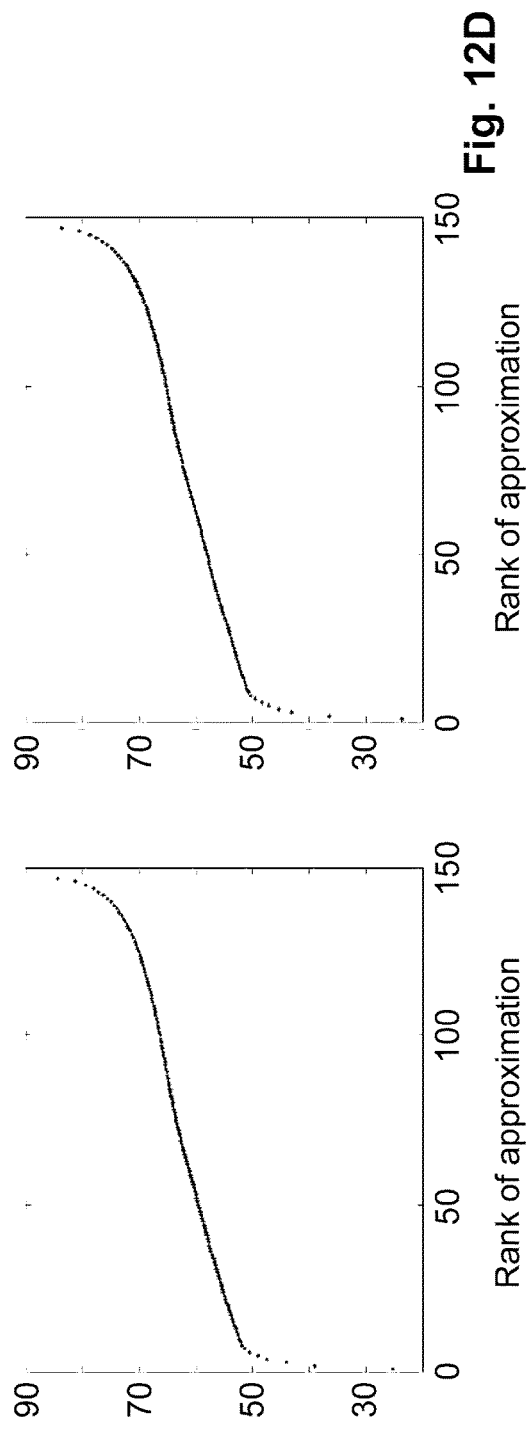
Figure 12C:
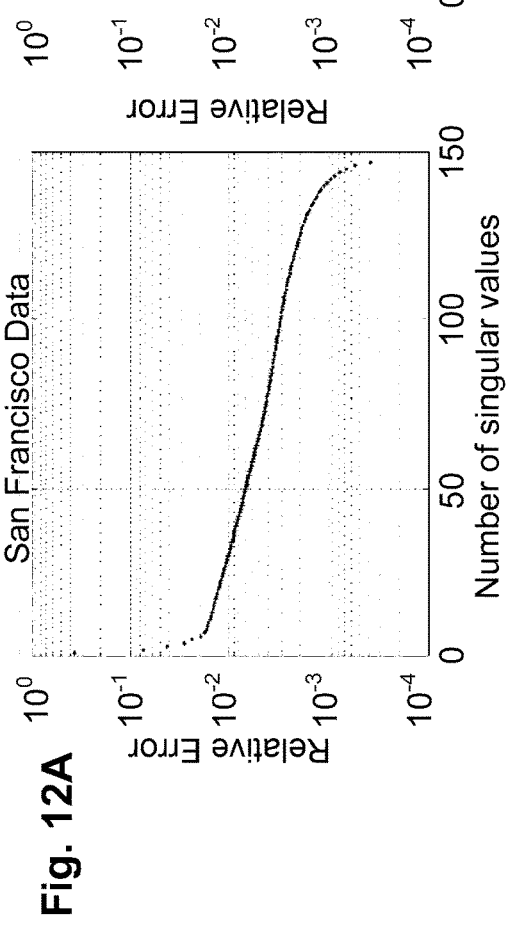

A further example is shown in FIGS. 11A and 11B to 11P in which a hyperspectral image of a scene was captured using a single photodiode using the above described techniques. In this example, an average image over the spectral bands 350-850 nm is shown in FIG. 11A, with individual spectral bands at 717 nm, 599 nm, 478 nm, 801 nm, 688 nm, 569 nm, 447 nm, 774 nm, 658 nm, 539 nm, 417 nm, 745 nm, 629 nm, 508 nm and 386 nm being shown in FIGS. 11B to 11P, respectively. A resulting three-spectral-band RGB image is shown in FIG. 11Q.

A further example will now be described that demonstrates that, for two examples of hyperspectral images, direct SVD provides effective compressibility in the spectral domain, effective approximations can be derived from a small amount of the image data and a small number of random projections, that basis functions derived from a hyperspectral image can be used as the basis function for a similar image and that with some loss of compressibility, this can be implemented with projection matrices whose elements are ±1.

For this example, a hyperspectral data cube $C \in \mathbb{R}^{m \times n \times f}$ consists of reflectance images $$S_k = C_{:,:,k} \in \mathbb{R}^{m \times n}, k = 1, \ldots, f$$

at different wavelengths. Specifically, the reflectance image at the $k^{th}$ frequency is denoted by $S_k \in \mathbb{R}^{m \times n}$, k=1, ..., f.

Focusing on compression in the spectral domain, $r_k$=vec $(S_k) \in \mathbb{R}^{mn}$ which stacks the columns of $S_k$ one below the other, the following data matrix can be formed:

$$M = [r_1 r_2 \ldots r_f]^T \in \mathbb{R}^{f \times mn}.$$

Considering spectral and spatial dimensions separately, spectral compression can be well approximated by a low rank matrix:

$$\|M - M_q\|_F \leq \epsilon, \mathrm{rank}(M_q) = q << f$$

Considering the spectral dimension, the singular value decomposition of M:

$$M = UDT^T,$$

$$U \in \mathbb{R}^{f \times f}, U^T U = U$$

$$V \in \mathbb{R}^{mn \times f}, V^T V = I$$

$$D = \mathrm{diag}(d_1 d_2 \ldots d_f), d_1 \geq d_2 \geq \ldots \geq d_f \geq 0$$

For $u_1, u_2, \ldots, u_f \in \mathbb{R}^f$ denoting the columns and $$U_q = (u_1, u_2, \ldots, u_q)$$

$$P_q = U_q U_q^T$$

The truncated SVD can be defined by:

$$M_q = P_q M$$

It can be verified that:

$$\|M - M_{ql}\|_F = \sum_{i=1}^{q} d_i^2$$

This decreases rapidly with q and the truncated singular value decomposition is the optimal low rank approximation to a matrix, with respect to the Frobenius norm.

A comparison was performed using two hyperspectral data including a landscape hyperspectral image of San Francisco having a spatial resolution of 1000×702, and a hyperspectral image of the Stanford Tower having a spatial resolution of 1000×801, both containing 148 spectral bands ranging from 415 nm to 950 nm.

As noted above, the truncated singular value decomposition is optimal with respect to the Frobenius norm and taking this as a benchmark, the relative error and peak signal to noise ratio (PSNR) for both data sets associated with the truncated singular value decomposition is as shown in FIGS. 12A to 12D. For these examples, the potential for compression is substantial with a truncation of just 10 leading to a relative error of 1.6%.

To use this approach it is necessary to know the datacube in order to calculate the singular value decomposition. However the right singular-vectors can be learned from a subset of the columns of M. In this case:

$$M = (c_1, c_2, \ldots, c_{nm})$$

$\Omega = \{i_1, i_2, \ldots, i_p\}$ is a random subset of $\{1, 2, m \ldots, mn\}$ and $$M^\Omega = (c_{i_1}, c_{i_2}, \ldots, c_{i_p})$$

It is possible to calculate the SVD of $M_\Omega$, namely $$M^\Omega = U^\Omega D^\Omega (V^\Omega)^T$$

The orthogonal projection is then:

$$P_q^\Omega := U_q^\Omega (U_q^\Omega)^T$$

And the low rank approximation is:

$$M_q^\Omega = P_q^\Omega M$$

Figures 13A, 13B, 14A, 14B:
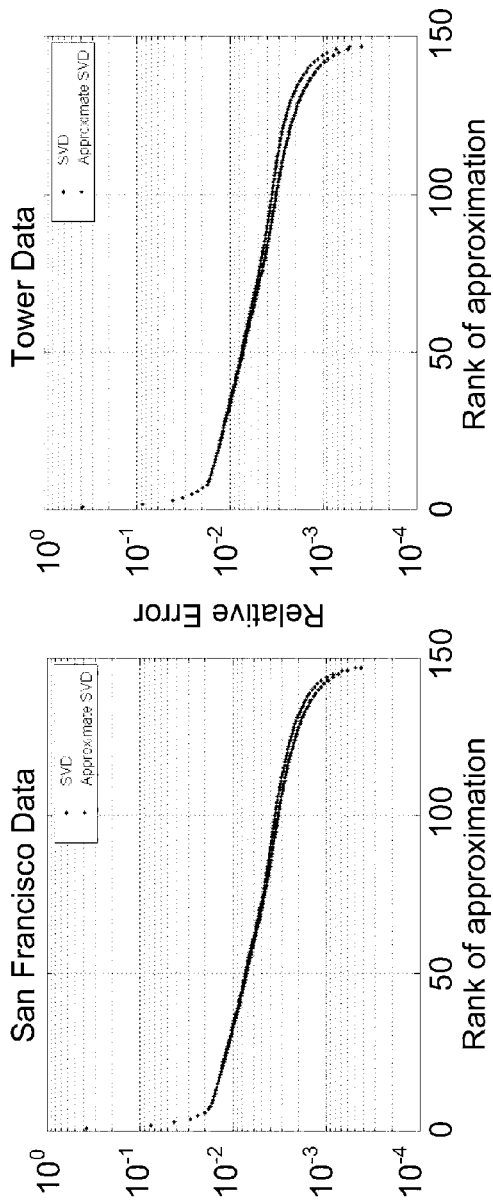
FIGS. 13A and 13B are graphs illustrating examples of relative error of truncated SVD and approximate SVD based on 1% of spatial points for San Francisco and Stanford Tower hyperspectral images respectively.
FIGS. 14A and 14B are graphs illustrating examples of relative error of truncated SVD and approximate SVD based on 1% of spatial projections for San Francisco and Stanford Tower hyperspectral images respectively.

Plots of the relative errors associated with $M_q$ and $M_q^\Omega$ are shown in FIGS. 13A and 13B for the case when p=0.01 mn—that is, 0.1% of the column vectors used to compute $U^\Omega$.

It is also possible to obtain an approximation of the right singular-vectors from compressed spatial data. Specifically, let $\Phi \in \mathbb{R}^{p \times mn}$ be a projection matrix, and let $$M^\Phi = M \Phi^T$$

which has a singular value decomposition $$M^\Phi =: U^\Phi D^\Phi (V^\Phi)^T$$

An orthogonal projection can be defined as $$P_q^\Phi := U_q^\Phi (U_q^\Phi)^T$$

This has been implemented for the case when the elements of the projection matrix $\Phi$ are independent random variables drawn from the Radmacher distribution.

Plots of the relative errors associated with $M_q$ and $M_q^\Phi$ are shown in FIGS. 14A and 14B for the case when p=0.01 mn—that is, 0.1% of the column vectors used to compute $U^\Phi$. It is apparent both techniques provide good approximations.

It is apparent that results based on random projections are substantially better than those based on a random selection of pixels. For graphical accuracy, the results are indistinguishable from the exact singular value decomposition. Results for further decreasing the number of special projection to 0.1% are shown in FIGS. 15A and 15B. The results are comparable to those using 10 times as many pixels. The explanation for this is that the random project provides a transformation that satisfies the Johnston-Lindenstrauss lemma essentially preserving the $l_2$ distances and angles between vectors in the lower dimensional vector space.

It is clear from the above that the San Francisco data and the Stanford Tower data compress in a very similar way. It is therefore of interest to see if projections learned from the San Francisco will compress the Stanford Tower data and conversely. To test this, orthogonal projections $P_q^\Omega$ learned from the San Francisco data using a random selection of 1% of the spatial data are applied to the Stanford Tower data. Projections learned from a random selection of 1% of the spatial data of the Stanford Tower hyperspectral image was also applied to the San Francisco data and the results are shown in FIGS. 16A and 16B.

An example of application with feasible measurement matrices for compressive sensing will now be described. in this regard, compressive sensing enables measurement of a relatively small number of projections of the datacube. It is apparent from the above that the spectral domain offers the greatest scope for compression so, for the purpose of the following, only spectral compression will be considered.

If q left singular-vectors $u_1, u_2, \ldots u_q \in \mathbb{R}^f$ are known, these can be used as a measurement matrix with:

$$U_q = (u_1, u_2, \ldots, u_q)$$

$$P_q = U_q U_q^T$$

the truncated singular value decomposition is $$M_q = P_q M = U_q U_q^T M$$

which means singular-vectors must be known and $U_q^T M$ measured.

Although singular vectors can be calculated without knowledge of the entire data cube, effective approximations to the projections $P_q$ can be obtained in the form $P_q^\Omega$ and $P_q^\Phi$ Taking an approximation:

$$\tilde{P}_q = \tilde{U}_q \tilde{U}_q^T$$

and calculate the approximate truncated singular value decomposition $$\tilde{M}_q = \tilde{P}_q M = \tilde{U}_q \tilde{U}_q^T M$$

This leads to excellent results for $\tilde{U}_q = U_q^\Omega$ and $\tilde{U}_q = U_q^\Phi$ although requires measurement of $\tilde{U}_q^T M$ which in turn requires our instrument to perform, at a minimum, fixed point arithmetic.

For the measurement matrix $\Phi_L \in \mathbb{R}^{k \times f}$, k≥q whose entries are independent random variables drawn from the Radmacher distribution, and a sufficiently large q, $\tilde{M}_q$ is a good approximation to M. Thus)

$$(\Phi_L \tilde{U}_q) \tilde{U}_q^T M = \Phi_L \tilde{M}_q \approx \Phi_L M$$

suggest the approximations $$\tilde{U}_q^T M \approx (\Phi_L \tilde{U}_q)^- \Phi_L M$$

$$\tilde{M}_q \approx \tilde{U}_q^T (\Phi_L \tilde{U}_q)^+ \Phi_L M$$

Results are shown in Table 2, highlighting good outcomes. The hybrid scheme refers to using the basis derived from the San Francisco data to approximate the Stanford Tower data and conversely, again highlighting acceptable results.

TABLE 2

| | San Francisco Relative Error | Stanford Tower |
|---|---|---|
| $P_q M$ | 0.016 | 0.015 |
| $U_q^T (\Phi_L U_q)^+ \Phi_L M$ | 0.023 | 0.022 |
| $(U_q^\Omega)^T (\Phi_L U_q^\Omega)^+ \Phi_L M$ | 0.022 | 0.024 |
| $(U_q^\Phi)^T (\Phi_L U_q^\Phi)^+ \Phi_L M$ | 0.024 | 0.024 |
| Hybrid | 0.023 | 0.024 |

A further approach for performing hyperspectral image recovery using a hybrid regularisation technique will now be described.

In this example, the electronic processing device processes the output signals by performing hybrid regularization to recover the hyperspectral image. In this regard, the hybrid regularization approach involves determining a cost function including a least-square-error data-fitting term, a spatial regularization term and a spectral regularization term. The cost function is then minimised using a suitable minimisation technique, such as accelerated proximal-subgradient method. In one example the spatial regularization term is determined at least in part based on a total variation of image frames for all spectral bands, whilst the spectral regularization term is determined at least in part based on a sparsifying transform of the spectral data of the hyperspectral image pixels.

Further details will now be described.

In this regard, recovery of a hyperspectral image from limited sampling or incomplete or noisy measurements can be performed to exploit the fact that hyperspectral images of natural scenes demonstrate a number of known properties, including that the natural images tend to consist of smooth regions with individual pixels having highly correlated spectral profiles. It is also reasonable to assume that the spatial and spectral domains of the hyperspectral image can be treated independently and hence the measurements can be collected by applying separate projections in the spatial and spectral domains.

To take advantage of the prior knowledge, the cost function is formulated containing a least-square-error data-fitting term and two distinct regularization terms pertaining to spatial and spectral domains. The regularization for the spatial domain is the sum of total variation of the image frames corresponding to all spectral bands, whilst the regularization for the spectral domain is the ft-norm of the coefficient matrix obtained by applying a suitable sparsifying transform to the spectral profile of all the hyperspectral image pixels. An accelerated proximal-subgradient method is then used to minimize the formulated cost function.

A comparative analysis of the above described approach and other example techniques will now be described. For the following explanation, a digitized datacube of a hyperspectral image is denoted by the three-dimensional tensor $\mathcal{X} \in \mathbb{R}^{N_v \times N_h \times N_s}$ where $N_v$ and $N_h$ represent the vertical and horizontal resolution of the image, respectively, in the spatial domain and $N_s$ represents the spectral resolution, i.e., the number of spectral bands at each image pixel. The 2-D image frame corresponding to the $k^{th}$ ($1 \leq k \leq N_s$) spectral band, which contains the $k^{th}$ spectral component of all the pixels is given by $F_k \in \mathbb{R}^{N_v \times K_h}$. Defining the number of image pixels as $N_p = N_v \times K_h$ allows formation of the matrix $X \in \mathbb{R}^{N_s \times N_p}$ as:

$$X = \begin{bmatrix} (vec\{F_1\})^T \\ \vdots \\ (vec\{F_{N_s}\})^T \end{bmatrix}$$

where: vec {.} is the vectorization operator that returns a column vector by stacking the columns of its matrix argument on top of each other.

It is assumed that the spatial and spectral domains are separable in the sense that two distinct multiplexing matrices for spatial and spectral domains can be used to capture information from the hyperspectral image in a compressive fashion. This assumption simplifies the acquisition process of the hyperspectral images to a great extent and is a reasonable assumption in hyperspectral imaging applications.

The multiplexing matrices of the spatial and spectral domains are defined by $\Phi_p \in \mathbb{R}^{M_p \times N_p}$ and $\Phi_s \in \mathbb{R}^{M_s \times N_s}$, respectively. Here, $M_p \leq N_p$ and $M_s \leq N_s$ are the number of respective projections made independently in the spatial and spectral domains. The multiplexed data are then sensed (measured) by the sensor. The incomplete and noisy matrix of acquired measurements, denoted by $Y \in \mathbb{R}^{M_s \times M_p}$, is expressed as:

$$Y = \Phi_s X \Phi_p^T + N \quad (8)$$

where: $N \in \mathbb{R}^{M_s \times M_p}$ is the matrix of background noise, which is assumed to have independent normally-distributed entries with zero mean and variance $\sigma^2 \in \mathbb{R}_+$.

Equation (8) can be written as:

$$vec\{Y\} = (\Phi_p \otimes \Phi_s) vec\{X\} + vec\{N\}$$

where $\otimes$ stands for the Kronecker product.

This expression indicates that the assumption of the inter-domain separability leads to a multiplexing matrix for the hyperspectral image that is the Kronecker product of two multiplexing matrices associated with the spatial and spectral domains. This Kronecker-product matrix can be described by $M_p \times N_p + M_s \times N_s$ entries as opposed to $M_p M_s \times N_p N_s$ entries without the separability assumption Basis Pursuit Denoising Natural images can be represented by their wavelet coefficients, which are usually sparse or compressible. Moreover, spectral data of natural image pixels can often be represented by few coefficients utilizing an appropriate representation (sparsification) basis. Invoking the inter-domain separability assumption, a sparse representation basis for the hyperspectral image can be devised as the Kronecker product of the representation bases for the spatial and spectral domains, which can be expressed as:

$$\Psi_p \otimes \Psi_s = \Psi_v \otimes \Psi_h \otimes \Psi_s.$$

Here, $\Psi_p \in \mathbb{R}^{N_p \times N_p}$ is a two-dimensional wavelet transform matrix, i.e., $\Psi_p = \Psi_v \otimes \Psi_h$ where $\Psi_v \in \mathbb{R}^{N_v \times N_v}$ and $\Psi_h \in \mathbb{R}^{N_h \times N_h}$ are one-dimensional wavelet transform matrices and $\Psi_s \in \mathbb{R}^{N_s \times N_s}$ is an orthonormal basis matrix for sparse representation of the spectral data.

Exploiting the abovementioned prior knowledge on sparseness of the hyperspectral image data in the basis $\Psi_p \otimes \Psi_s$, the hyperspectral image X can be recovered from the incomplete and noisy measurements Y by solving a basis pursuit denoising problem (BPDN). This means x is the unique solution to the following strictly convex minimization problem:

$$\min_X \left[ \frac{1}{2} \| Y - \Phi_s X \Phi_p^T \|_2^2 + \gamma \| (\psi_v \otimes \Psi_h \otimes \Psi_s) vec\{X\} \|_1 \right] = \quad (9)$$

$$\min_X \left[ \frac{1}{2} \| Y - \Phi_s X \Phi_p^T \|_2^2 + \gamma \| \Psi_s^T X \Psi_p \|_1 \right]$$

Here, $\|\cdot\|_2$ and $\|\cdot\|_1$ stand for the entry-wise matrix $l_2$ and $l_1$ norms, respectively. The first term on the right-hand side of the cost function in (9) accounts for data consistency and the second term is a regularizer that promotes sparsity. The regularization parameter $\gamma \in \mathbb{R}_+$ balances a trade-off between the two terms.

An efficient approach for solving equation (9) is a proximal-gradient algorithm, which solves the BPDN problem in an iterative manner. At each iteration, it updates the solution by taking a step along the opposite direction of the gradient of the data-consistency term followed by applying the proximity operator of the $l_1$-norm-based regularization term. These steps can be stated as:

$$\lambda_n = \beta \lambda_{n-1}$$

$$X_{n-1/2} = X_{n-1} + \lambda_n \Phi_s^T (Y - \Phi_s X_{n-1} \Phi_p^T) \Phi_p$$

$$X_n = \text{prox}_w \{X_{n-1/2}\} \quad (10)$$

defining:

$$w(X) = \gamma \| \Psi_s^T X \Psi_p \|_1, \quad (11)$$

where: index n represents iteration number,
$\lambda_n \in \mathbb{R}_+$ is the time-varying step-size, and
$\beta \in \mathbb{R}_+$ is a step-size tuning parameter usually set to a value larger than 1.

$$\text{prox}_f\{S\} = \arg\min_U \left[ f(U) + \frac{1}{2} \| S - U \|_2^2 \right]. \quad (12)$$

The proximity operator of the weighted $l_1$-norm of a scalar $s \in \mathbb{R}$ is calculated as $$\text{prox}_{\xi \|\cdot\|_1}\{s\} = \begin{cases} s - \xi & s > \xi \\ 0 & |s| \le \xi \\ s + \xi & s < -\xi \end{cases} \quad (13)$$

The proximity operator of the weighted $l_1$-norm of a matrix $S \in \mathbb{R}^{N_s \times N_p}$ is calculated by applying (13) to all the individual entries of S independently.

In view of the orthonormality of $\Psi_p$ and $\Psi_s$, (10) can be written as $$x_n = \Psi_s \text{prox}_{\lambda_n \gamma \|\cdot\|_1} \{ \Psi_s^T X_{n-1/2} \Psi_p \} \Psi_p^T.$$

To accelerate the convergence of the above proximal-gradient algorithm, an acceleration scheme, originally used to speed up the convergence of gradient-descent methods, can be used until the stoppage criterion is satisfied as described by $$|X_n - X_{n-1}|_2 / |X_{n-1}|_2 < \tau \text{ or } n > C \quad (14)$$

where: $\Sigma \in \mathbb{R}_+$ is a threshold parameter and
$C \in \mathbb{N}$ is the maximum allowed number of iterations.

This algorithm is referred to as accelerated proximal-gradient BPDN (APG-BPDN) below.

Hybrid Regularisation

Natural images tend to be constituted of mostly piece-wise smooth regions with limited rapid variations at edges of the regions. Hence, the total variation of a natural image is typically smaller than that of its distorted or noisy versions. This property is commonly utilized to recover images from their incomplete or noisy versions. It is also known that minimizing the total variation of an image usually leads to a better recovery performance compared with minimizing the $l_1$-norm of the wavelet coefficients of the image.

Based on this knowledge, the hybrid regularisation technique operates to recover the hyperspectral data X from the incomplete and noisy observations Y by solving the following minimization problem:

$$\min_X \left[ \frac{1}{2} \| Y - \Phi_s X \Phi_p^T \|_2^2 + \gamma_1 \sum_{k=1}^{N_s} t(F_k) + \gamma_2 \| \Psi_s^T X \|_1 \right]. \quad (15)$$

The cost function in equation (15) has two regularization terms. The first regularization term is a spatial term based on a sum of total variations of all the image frames in the hyperspectral datacube, whereas the spectral term is a sum of the $l_1$-norm of the transform coefficients of all the image pixels. The regularization parameters $\gamma_1 \in \mathbb{R}_+$ and $\gamma_2 \in \mathbb{R}_+$ create a balance between the regularization terms and the data-consistency term. The function $t(F_k): \mathbb{R}^{N_v \times K} h \to \mathbb{R}_+$ returns the isotropic total variation of the image frame $F_k$. It is defined as $$t(F_k) = \sum_{i=1}^{N_v} \sum_{j=1}^{N_h} \| d_{i,j,k} \|_2$$

where $$d_{i,j,k} = \begin{bmatrix} d_{i,j,k}^v \\ d_{i,j,k}^h \end{bmatrix},$$

$$d_{i,j,k}^v = \begin{cases} x_{i+1,j,k} - x_{i,j,k} & j < N_v \\ 0 & j = N_v, \end{cases}$$

$$d_{i,j,k}^h = \begin{cases} x_{i,j+1,k} - x_{i,j,k} & j < N_h \\ 0 & j = N_h, \end{cases}$$

and $X_{i,j,k}$ is the (i,j,k)th entry of $\mathcal{X}$.

Equation (15) can be solved by employing a proximal-subgradient method whose iterations are given by:

$$\lambda_n = \beta \lambda_{n-1} \quad (16)$$

$$X_{n-1/2} = X_{n-1} + \lambda_n \left[ \Phi_s^T (Y - \Phi_s X_{n-1} \Phi_p^T) \Phi_p - \gamma_1 \sum_{k=1}^{N_s} G(F_{k,n-1}) \right]$$

$$X_n = \text{prox}_{\lambda_n \gamma_2 \|\cdot\|_1 \circ \Psi_s^T} \{X_{n-1/2}\}$$

where: $\circ$ denotes the function composition operator.
This can be written as $$X_n = \Psi_s \text{prox}_{\lambda_n \gamma_2 \|\cdot\|_1} (\Psi_s^T X_{n-1/2})$$

The function $G(F_k): \mathbb{R}^{N_v \times N_h} \to \mathbb{R}^{N_v \times N_h}$ returns a subgradient of the total-variation of the kth image frame, $F_k$. The (i,j)th entry of $G(F_k)$ is computed as $$g_{i,j,k} = \begin{cases} \dfrac{d^v_{i-1,j,k}}{\|d_{i-1,j,k}\|_2 + \epsilon} & i > 1 \\ 0 & i = 1 \end{cases} +$$

$$\begin{cases} \dfrac{d^h_{i,j-1,k}}{\|d_{i,j-1,k}\|_2 + \epsilon} & j > 1 \\ 0 & j = 1 \end{cases} - \dfrac{d^v_{i,j,k}}{\|d_{i,j,k}\|_2 + \epsilon} - \dfrac{d^h_{i,j,k}}{\|d_{i,j,k}\|_2 + \epsilon}$$

where: $\epsilon \in \mathbb{R}_+$ is a small positive constant to avoid division by zero.

Note that calculation of the subgradient matrices $G(F_k)$, $k=1, \ldots, N_s$, does not necessarily require rearrangement of the matrix X into Iv, image frames $F_k$, $k=1, \ldots, N_s$. However, $G(F_k)$ can be calculated directly from x considering that $x_{i,j,k}$ is in fact the $(i+(j-1)N_v,k)$th entry of x.

The same acceleration scheme as in the APG-BPDN algorithm as well as the stoppage criterion (14) can be used in the proposed algorithm. Convergence analysis demonstrates convergence of the proposed algorithm.

Simulation Results

The Stanford Dish hyperspectral image, publicly available on the website of the Stanford Center for Image Systems Engineering was resited to have spatial resolution of 512×512 and 128 spectral bands.

Natural images are known to have most of their energy concentrated in the lower parts of their two-dimensional Fourier or Walsh spectra. Therefore, a multiplexing matrix was used for the spatial domain, $\Phi_p$, that extracts $M_p$ top-left coefficients of the two-dimensional Walsh-Hadamard transform of the vectorized image that it multiplies. The coefficients are chosen in an order that is the same as the zig-zagging pattern used by the JPEG still-image data compression standard.

Since most of the energy of the spectral profile of a typical natural image pixel is also contained in the low-sequency part of its Walsh spectrum, $M_s$ top rows of the sequency-ordered Hadamard matrix of order $N_s$ are used as the multiplexing matrix in the spectral domain, $\Phi_s$. The main advantages of using the above matrices for multiplexing are that their entries only take values of ±1 and can be realized via the fast Walsh-Hadamard transform utilizing minimal memory and computations. This makes them suitable for real-world applications where they can be implemented using digital micro-mirror devices (DMDs) or multiplexed sensor arrays.

The two-dimensional Haar wavelet transform matrix is used as the representation basis for the spatial domain, $\Psi_p$, in the APG-BPDN algorithm. In order to find a good estimate for the representation basis of the spatial domain, $\Psi_s$, one percent of the pixels are randomly selected, i.e., $\acute{N}_p = N_p/100$ pixels, and their spectra are arranged in a matrix called $\acute{X} \in \mathbb{R}^{N_s \times \acute{N}_p}$. An economic singular-value decomposition of $\acute{x}$ is performed to obtain $$\acute{x} = \acute{U}\acute{\Sigma}\acute{V}^T$$

This is used to calculate the left-singular-vector subspace $\acute{U}$ as the spectral basis matrix, i.e., $\Psi_s = \acute{U}$.

The measurements, $\Phi_s X \Phi_p^T$, are contaminated by additive zero-mean noise of variance $\sigma^2 = 0.01$, the threshold for stopping criterion is $\tau = 10^{-4}$ and the number of maximum iterations is set to $c=150$ while the other parameters, $\gamma, \gamma_1, \gamma_2, \lambda_0$, and $\beta$, are tuned to yield the best performance for both algorithms. As the performance measure, the relative error is used, defined by $$\dfrac{\|X - X_\infty\|_2^2}{\|X\|_2^2}$$

where: $X_\infty$ denotes the converged value of $X_n$.

Figure 17:
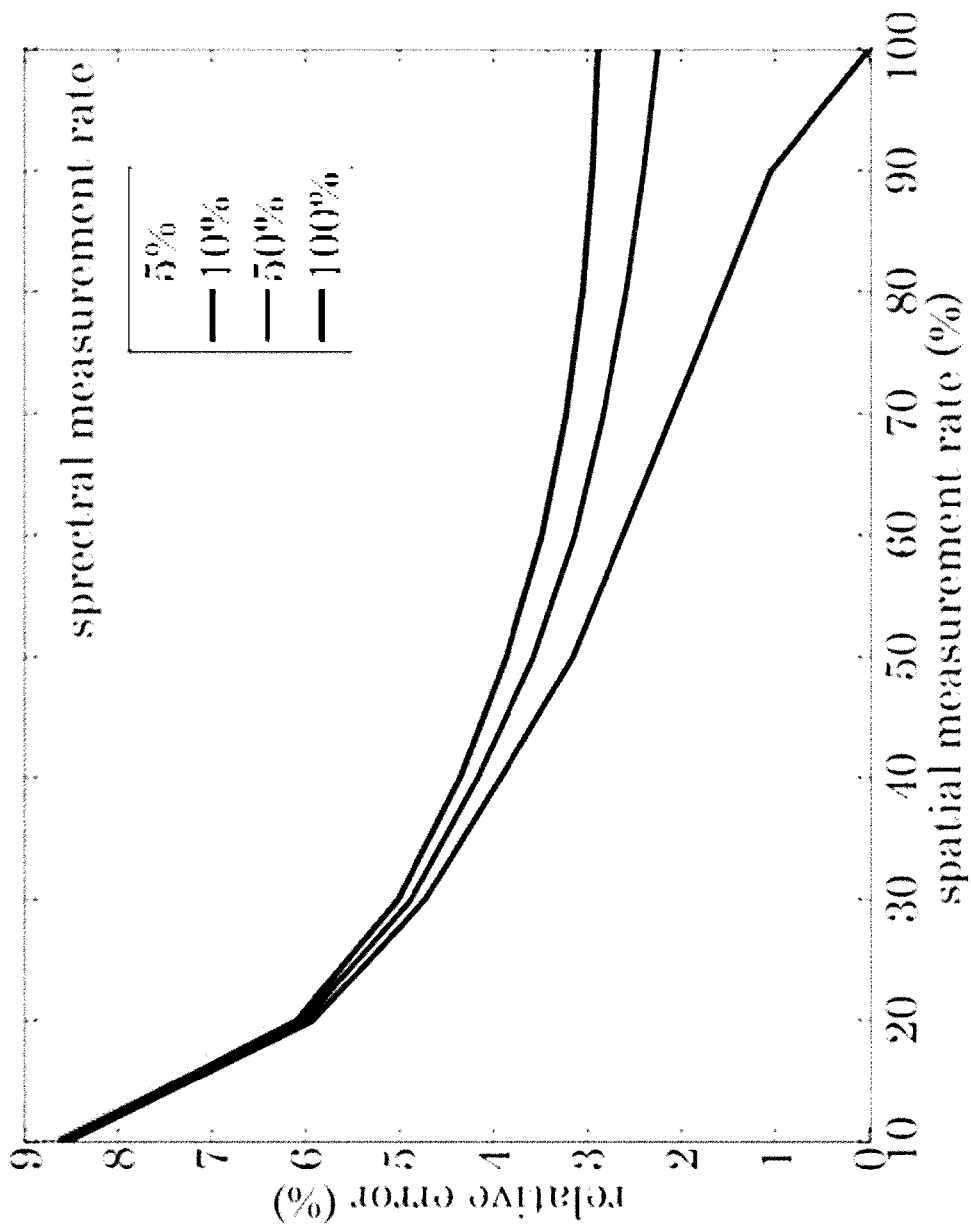
FIG. 17 is a graph illustrating relative recovery errors for different sampling rates.

In FIG. 17, the relative error of the proposed algorithm is plotted as a function of spatial measurement rate, i.e. $r_p = M_p/N_p$, for different values of the spectral measurement rate, i.e., $r_s = M_s/N_s$.

Figure 18A:
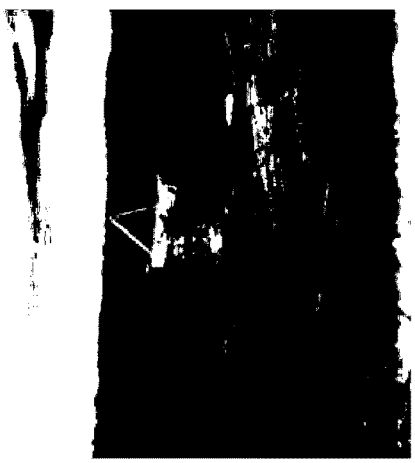
FIGS. 18A to 18D are example RGB images of the original and recovered version of the Stanford Dish hyperspectral image with different values for the spatial measurement rate, $r_p$, and the spectral measurement rate, $r_s$; and, FIG. 19 is a graph illustrating convergence curves for a basis pursuit noising and hybrid regularization approaches for the Stanford Dish hyperspectral image with $r_p=0.2$ and $r_s=0.1$.
Figure 18B:
Figure 18C:
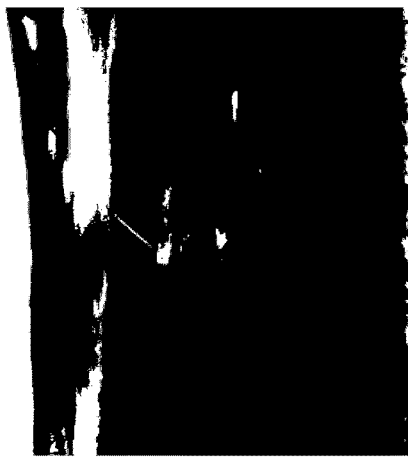
Figure 18D:
Figure 19:
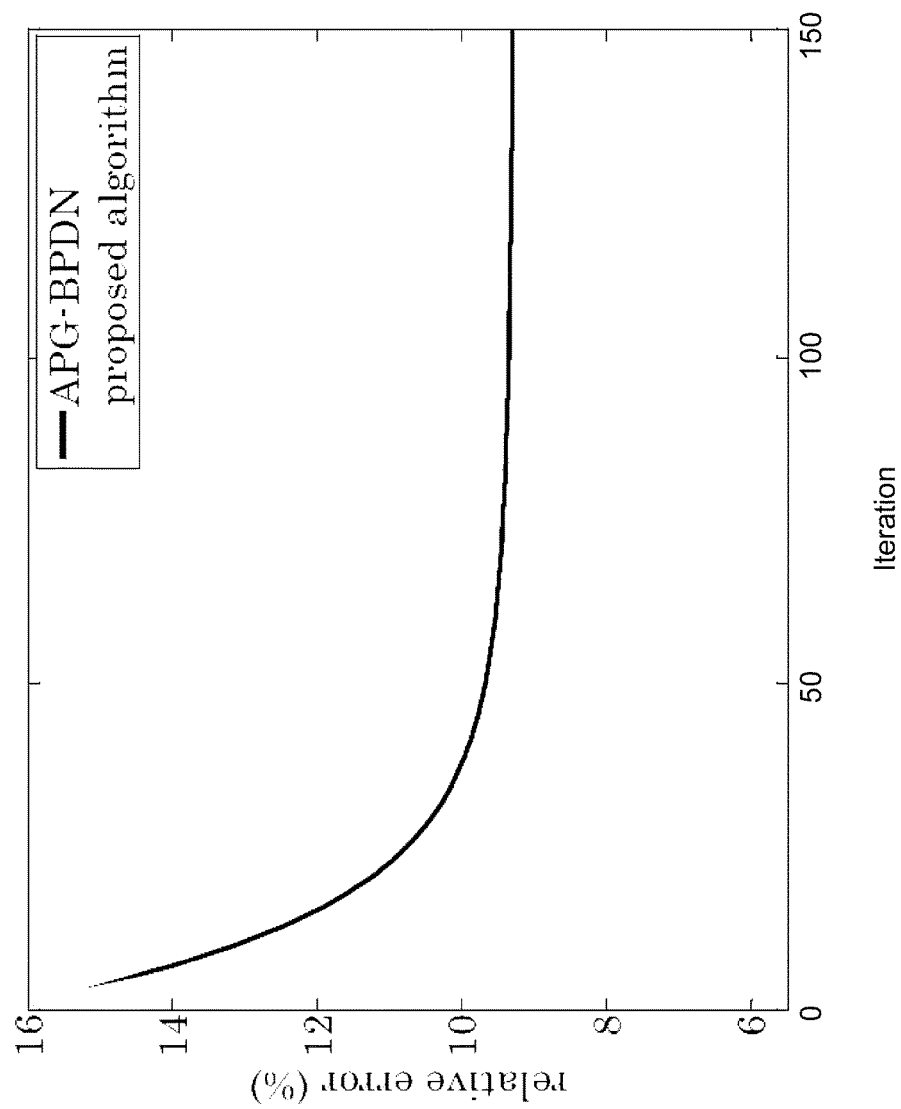

FIG. 18A is an RGB illustration of the Stanford Dish image, with FIGS. 18B to 18D showing reconstructed versions using the proposed algorithm with values of $r_p$ and $r_s$ of $r_p=0.1$ and $r_s=0.05$, $r_p=0.4$ and $r_s=0.1$, and $r_p=0.4$ and $r_s=0.2$, respectively. In FIG. 19, the relative errors of both algorithms are plotted against the number of iterations when $r_p=0.2$ and $r_s=0.1$ for the Stanford Dish image. These results demonstrate that the hybrid regularization approach has an excellent performance and significantly outperforms a conventional counterpart in the form of the APG-BPDN algorithm.

Accordingly, this shows the recovery of a hyperspectral image from its incomplete and noisy measurements. In particular, this is achieved using a cost function comprising two distinct regularization terms corresponding to the spatial and spectral domains. This hybrid regularization scheme minimises the total variation of the image frames in the spatial domain and promotes sparsity of the image pixels in the spectral domain simultaneously. An accelerated proximal-subgradient algorithm can be used for minimizing the devised cost function. Simulation results corroborate the good performance of the proposed algorithm as well as its superiority over an accelerated proximal-gradient algorithm that solves the pertinent basis-pursuit denoising problem. It will also be appreciated from this that in a similar manner this approach can be used when subsampling in both the spatial and spectral domains.

Accordingly, the above described techniques can achieve improved outcomes with a similar number of samples as compression sampling, or alternatively can achieve similar outcomes with reduced amounts of sampling, and can therefore reduce imaging time whilst obtaining the same outcome as traditional compression sampling.

In particular, the above described approaches provide a new system for hyperspectral imaging using a single point spectrometer to sample the spectrum bands of a 2-D scene so as to substantially reduce the integration time and data size to achieve low-cost high-speed performance. This brings significant savings in cost, processing time, and storage. For example, "snapshot" spatial 2-D hyperspectral cameras cost hundreds of thousands of dollars, while the above described system can be implemented for a fraction of the cost. Additionally, whilst it could take about 24 hours for a hyperspectral line scanner to obtain the hyperspectral cube for a 1000×1000 image, the above described system can take orders of magnitude less (e.g. electronic switches vs. mechanic motor motions).

Furthermore, the amount of data generated by the conventional 2-D hyperspectral cameras causes difficulty for local storage or transmission (even for using USB2.0), whereas the above described system needs to store/transfer less than 5% of the original amount of data, which could be handled efficiently. For instance, the amount of data for a single 1000×1000×600 hyperspectral cube to be stored/transmitted using conventional hyperspectral imager could easily reach 600 megabytes, while using our system, it is only about 18 megabytes.

The techniques can use sparse coding to identify the sparse domain for the spectral image so as to significantly reduce the number of samples required to reconstruct the 2-D scene from the single point spectrometer. The use of sparse coding increases the sparsity of the spectrum signals, which in turn reduces the number of measurements needed for reconstruction resulting in at least 10 times less integration time.

In one example, the subsampling of the spectrum bands is achieved by taking singular value decomposition (SVD) of the sparse domain, and keeping the first few left singular vectors as the rows of the sensing matrix, which further reduces the number of measurements by using the left singular vectors from SVD of the sparse domain.

Sampling can be achieved by controlling a digital micromirror device (DMD) so that only one randomly selected micro-mirror in each row of the micro-mirror array is turned on.

In one example, the subsampling of the spectrum bands is achieved by employing an optical modulator to concentrate the energy into one random band each time. This approach can concentrates the energy from all spectrum bands into one spectrum band, which further reduces the integration time of the sensor.

Alternatively, the sampling of the spectrum bands can involve turning all the micro-mirrors on once followed by randomly turning on/off micro-mirrors with equal probability.

Furthermore, the above described system can use dictionaries for each category of objects (based on colors, shapes, features and/or other contexts). In one example, this involves using data, such as an RGB image, to adaptively choose the dictionaries obtained earlier according to the colors, shapes, features and/or other contexts from the RGB images during the signal recovery/unmixing stage. The use of RGB images or other scene attribute data, such as thermal information, enables the adaptive selection of dictionaries from the library to perform reconstruction/unmixing tasks.

The above described techniques are applicable to spectrum coverage over UV, visible, NIR, SWIR, and even thermal. Furthermore, the proposed system only needs to cool down one photon detector rather than the whole CCD array when applied to infrared sensing.

Although the above techniques have been described as being applied to hyperspectral imaging, the processes could also be used on multispectral imaging. However, as multispectral employs reduced numbers of frequency bands, the benefits obtained are not as significant, and it will therefore be appreciated that application to hyperspectral imaging is preferred.

In this case, the invention would provide an apparatus and method for multispectral imaging, the apparatus including input optics that receive radiation from a scene, a spatial modulator that spatially samples radiation received from the input optics to generate spatially sampled radiation, a spectral modulator that spectrally samples the spatially sampled radiation received from the spatial modulator to generate spectrally sampled radiation, a sensor that senses spectrally sampled radiation received from the spectral modulator and generates a corresponding output signal and at least one electronic processing device that: controls the spatial and spectral modulators to cause spatial and spectral sampling to be performed; receives output signals; and, processes the output signals in accordance with performed spatial and spectral sampling to generate a multispectral image.

Thus, in this context it will be appreciated that the term hyperspectral could be more generically referred to as multispectral and would cover both hyper- and multi-spectral imaging.

In the above examples, the implementation has focused in 2-D imaging of a scene. However, it will be appreciated that this is not essential, and alternatively the techniques could be applied to 1-D imaging of a scene. In this instance the apparatus can be simplified, for example by allowing the spatial modulator to be formed from a linear as opposed to a 2-D DMD, or other similar modulator.

The use of 1-D hyperspectral imaging has a number of particular applications, such as imaging of objects being transported past the imaging apparatus. For example, this can be used to image objects being transported on a conveyor belt, with a single pixel width image being captured across the conveyor belt, so that objects are imaged as they pass by the imaging apparatus. This finds particular use in assessing objects, for example when assessing object type and/or quality. It will also be appreciated that this could be used in a scanning apparatus that is moved relative to a scene in order to image the entire scene.

Whilst the above described examples have described imaging apparatus and method of performing imaging of a scene, it will be appreciated that the techniques can also be applied to compress and subsequently recover compressed hyperspectral images. In this regard, the pre-existing hyperspectral image data can be sampled spatially and spectrally, allowing the relevant content of the image to be encoded using a reduced amount of data, for example to facilitate electronic transfer and/or storage of hyperspectral images. Following this, the above described techniques could be applied to allow recovery of the hyperspectral image. From this, it will be appreciated that reference to imaging and compression of images should be considered as interchangeable and reference to imaging and compression independently is not intended to be limiting.

Accordingly, in one example, apparatus can be provided for compressing a hyperspectral image, the apparatus including one or more electronic processing devices that compress a hyperspectral image by spatially sampling hyperspectral image data and spectrally sampling hyperspectral image data, and recover the hyperspectral image by processing the sampled hyperspectral image data in accordance with the performed spatial and spectral sampling to generate hyperspectral image data. It will be appreciated that the sampling and recovery can be performed in accordance with the previously outlined techniques and this will not therefore be described in further detail.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. Apparatus for hyperspectral imaging, the apparatus including:

a) input optics that receive radiation from a scene;
b) a spatial modulator that spatially samples radiation received from the input optics to generate spatially sampled radiation;
c) a spectral modulator that spectrally samples the spatially sampled radiation received from the spatial modulator to generate spectrally sampled radiation;
d) a sensor that senses spectrally sampled radiation received from the spectral modulator and generates a corresponding output signal; and,
e) at least one electronic processing device that:
  i) controls the spatial and spectral modulators to cause spatial and spectral sampling to be performed;
  ii) receives output signals; and,
  iii) processes the output signals in accordance with performed spatial and spectral sampling to generate a hyperspectral image;
f) a waveguide that receives the spatially sampled radiation from the spatial modulator and transfers this to the spectral modulator; wherein the waveguide includes a fibre optic array.

2. Apparatus according to claim 1, wherein at least one of:
a) the spatial modulator includes at least one of:
  i) a digital mirror device;
  ii) a microshutter array;
  iii) a multiplexed sensor array; and,
  iv) a liquid crystal on silicon device; and,
b) the spectral modulator includes at least one of:
  i) a linear digital mirror device;
  ii) a liquid crystal on silicon device;
  iii) a microshutter array;
  iv) a multiplexed sensor array;
  v) a dispersive element that spatially separates the frequency bands;
  vi) a diffraction grating; and,
  vii) a prism.

3. Apparatus according to claim 1, wherein at least one of:
a) the spatial sampling includes at least one of:
  i) a linear sum of multiple random pixels;
  ii) a single random pixel; and,
  iii) a weighted sum of selected pixels; and,
b) the spectral sampling includes at least one of:
  i) a linear sum of multiple random frequency bands;
  ii) a single random frequency band; and,
  iii) a weighted sum of selected frequency bands.

4. Apparatus according to claim 1, wherein the sampling includes at least one of:
a) sub sampling;
b) compressive sensing sampling; and,
c) singular value decomposition sampling.

5. Apparatus according to claim 4, wherein the electronic processing device performs subsampling by:
a) obtaining multiple signals each of which is determined using a sample of a different single randomly selected frequency band or pixel; and,
b) processing the signals in accordance with the different randomly selected frequency bands or pixels and a dictionary.

6. Apparatus according to claim 5, wherein the electronic processing device randomly selects each frequency band or pixel by randomly selecting a row in an identity matrix.

7. Apparatus according to claim 4, wherein the electronic processing device performs a singular value decomposition sampling by:
a) obtaining multiple signals each of which is determined using a sample of a different weighted sum of multiple determined frequency bands or pixels; and,
b) processing the signals in accordance with the different weighted sums of multiple determined frequency bands or pixels and a dictionary.

8. Apparatus according to claim 7, wherein the electronic processing device selects the multiple determined frequency bands or pixels using a singular value decomposition of a matrix dictionary.

9. Apparatus according to claim 4, wherein the electronic processing device performs compressive sensing by:
a) obtaining a signal determined using a single sample of all pixels and all frequency bands;
b) obtaining multiple signals each of which is determined using a sample of a different linear sum of multiple random frequency bands or pixels; and,
c) processing the signals in accordance with the single sample of all pixels and all frequency bands, the different linear sums of multiple random frequency bands or pixels and a dictionary.

10. Apparatus according to claim 9, wherein the electronic processing device:
a) obtains a first signal corresponding to a single sample of all pixels and all frequency bands;
b) obtains multiple second signals, each second signal corresponding to a single sample of a respective linear sum of multiple random frequency bands or pixels;
c) generates multiple third signals by subtracting each second signal from the first signal; and,
d) processes the signals by processing the second and third signals.

11. Apparatus according to claim 1, wherein the electronic processing device processes the output signals by performing hybrid regularization to recover the hyperspectral image.

12. Apparatus according to claim 11, wherein the electronic processing device:
a) determines a cost function including:
  i) a least-square-error data-fitting term;
  ii) a spatial regularization term; and,
  iii) a spectral regularization term; and,
b) minimises the cost function.

13. Apparatus according to claim 12, wherein at least one of:
a) the spatial regularization term is determined at least in part based on at least one of:
  i) a total variation of image frames for all spectral bands; and,
  ii) a sparsifying transform of spectral data of hyperspectral image pixels; and,
b) the electronic processing device minimises the cost function using an accelerated proximal-subgradient method.

14. Apparatus according to claim 1, wherein the electronic processing device:
a) determines a dictionary; and,
b) using the dictionary, at least one of:
  i) selects sampling to be performed;
  ii) selects pixels for spatial sampling;
  iii) selects frequency bands for spectral sampling; and
  iv) processes the signals to generate a hyperspectral image.

15. Apparatus according to claim 1, wherein the electronic processing device determines the dictionary using at least one of:
a) sparse coding to learn the dictionary;
b) singular value decomposition of sample data to calculate the dictionary;

c) singular value decomposition of sample data to calculate the dictionary, the sample data being test data captured during sensor calibration; and,
d) scene attributes to select one of a number of learned dictionaries.

16. Apparatus according to claim 15, wherein the electronic processing device determines scene attributes using at least one of:
   a) signals received from a scene sensor; and,
   b) user input commands.

17. Apparatus according to claim 1, wherein the sensor is a single pixel hyperspectral sensor.

18. Apparatus for hyperspectral imaging, the apparatus including:
   a) input optics that receive radiation from a scene;
   b) a spatial modulator that spatially samples radiation received from the input optics to generate spatially sampled radiation;
   c) a spectral modulator that spectrally samples the spatially sampled radiation received from the spatial modulator to generate spectrally sampled radiation;
   d) a sensor that senses spectrally sampled radiation received from the spectral modulator and generates a corresponding output signal;
   e) at least one electronic processing device that:
      i) controls the spatial and spectral modulators to cause spatial and spectral sampling to be performed;
      ii) receives output signals; and,
      iii) processes the output signals in accordance with performed spatial and spectral sampling to generate a hyperspectral image; and,
   f) a waveguide that receives the spatially sampled radiation from the spatial modulator and transfers this to the spectral modulator; wherein the waveguide includes a photonic lantern including at least one multimode optical fibre that receives the spatially sampled radiation and a plurality of single mode optical fibres that supply the spatially sampled radiation to the spectral modulator.

* * * * *